United States Patent
Shiina et al.

(10) Patent No.: US 8,381,867 B2
(45) Date of Patent: Feb. 26, 2013

(54) TRANSMISSION RATIO VARIABLE MECHANISM AND VEHICLE STEERING APPARATUS INCLUDING THE SAME

(75) Inventors: Akihiko Shiina, Kashihara (JP); Motoyasu Yamamori, Nagoya (JP)

(73) Assignee: JTEKT Corporation, Osaka-Shi (JP)

( * ) Notice: Subject to any disclaimer, the term of this patent is extended or adjusted under 35 U.S.C. 154(b) by 287 days.

(21) Appl. No.: 13/001,716

(22) PCT Filed: Jul. 6, 2009

(86) PCT No.: PCT/JP2009/003133
§ 371 (c)(1),
(2), (4) Date: Dec. 28, 2010

(87) PCT Pub. No.: WO2010/004723
PCT Pub. Date: Jan. 14, 2010

(65) Prior Publication Data
US 2011/0108355 A1    May 12, 2011

(30) Foreign Application Priority Data
Jul. 7, 2008  (JP) ................................. 2008-177321

(51) Int. Cl.
*B62D 5/04* (2006.01)
(52) U.S. Cl. ........... 180/444; 74/416; 475/149; 475/163
(58) Field of Classification Search ............. 180/443, 180/444; 74/388 PS, 416; 475/149, 163, 475/164
See application file for complete search history.

(56) References Cited

U.S. PATENT DOCUMENTS

| | | | | |
|---|---|---|---|---|
| 3,322,984 A | * | 5/1967 | Anderson | 310/82 |
| 3,935,750 A | * | 2/1976 | Maroth | 74/61 |
| 5,906,250 A | * | 5/1999 | Haga et al. | 180/444 |
| 8,216,104 B2 | * | 7/2012 | Kuroumaru et al. | 475/164 |
| 8,245,814 B2 | * | 8/2012 | Yao et al. | 180/444 |
| 2007/0261909 A1 | * | 11/2007 | Higashi et al. | 180/446 |
| 2008/0073143 A1 | * | 3/2008 | Yamanaka | 180/444 |
| 2009/0200100 A1 | * | 8/2009 | Arbanas | 180/447 |
| 2010/0004823 A1 | * | 1/2010 | Nakatsu | 701/41 |
| 2010/0224436 A1 | * | 9/2010 | Shiina et al. | 180/444 |
| 2010/0282535 A1 | * | 11/2010 | Saitou et al. | 180/444 |

FOREIGN PATENT DOCUMENTS
JP    A-11-315908    11/1999
(Continued)

OTHER PUBLICATIONS

Extended European Search Report issued in European Application No. 09794171.0 dated Jul. 2, 2012.

(Continued)

*Primary Examiner* — Anne Marie M Boehler
(74) *Attorney, Agent, or Firm* — Oliff & Berridge, PLC

(57) ABSTRACT

A transmission ratio variable mechanism includes an input member and an output member arranged to rotate around a first axis, an intermediate member arranged to connect the input member and the output member so as to be differentially rotatable, and a motor arranged to drive the intermediate member. The motor includes a cylindrical rotor arranged to rotate around the first axis. An inner periphery of the rotor is arranged to support the intermediate member and arranged to rotatably support the input member and the output member via bearings, respectively.

10 Claims, 13 Drawing Sheets

FOREIGN PATENT DOCUMENTS

| | | |
|---|---|---|
| JP | A-2006-046405 | 2/2006 |
| JP | A-2006-082718 | 3/2006 |
| JP | A-2007-170624 | 7/2007 |
| JP | A-2008-030747 | 2/2008 |
| JP | A-2008-087598 | 4/2008 |

OTHER PUBLICATIONS

International Search Report in International Application No. PCT/JP2009/003133; dated Sep. 1, 2009 (with English-language translation).

* cited by examiner

FIG. 7A
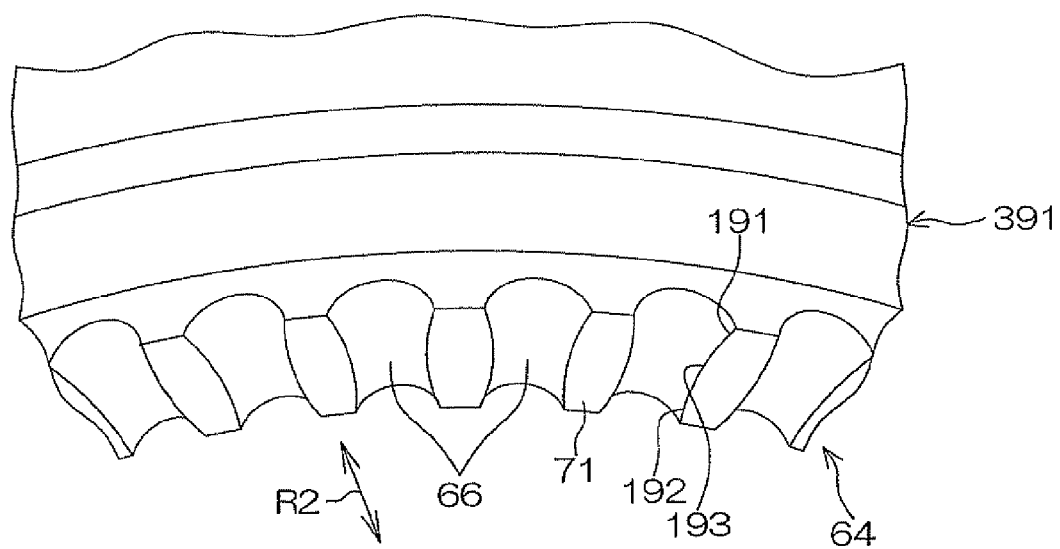
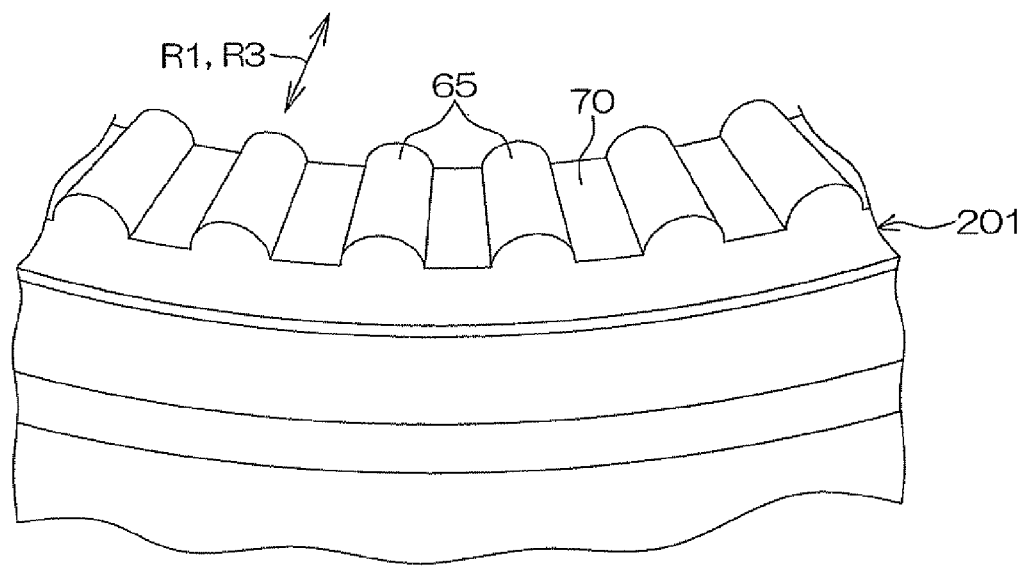
FIG. 7B
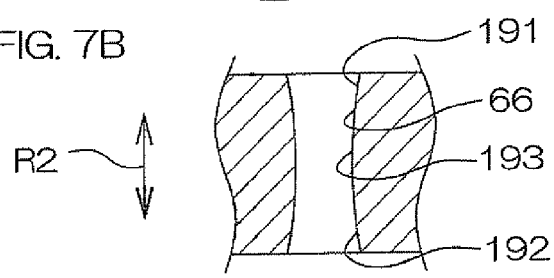

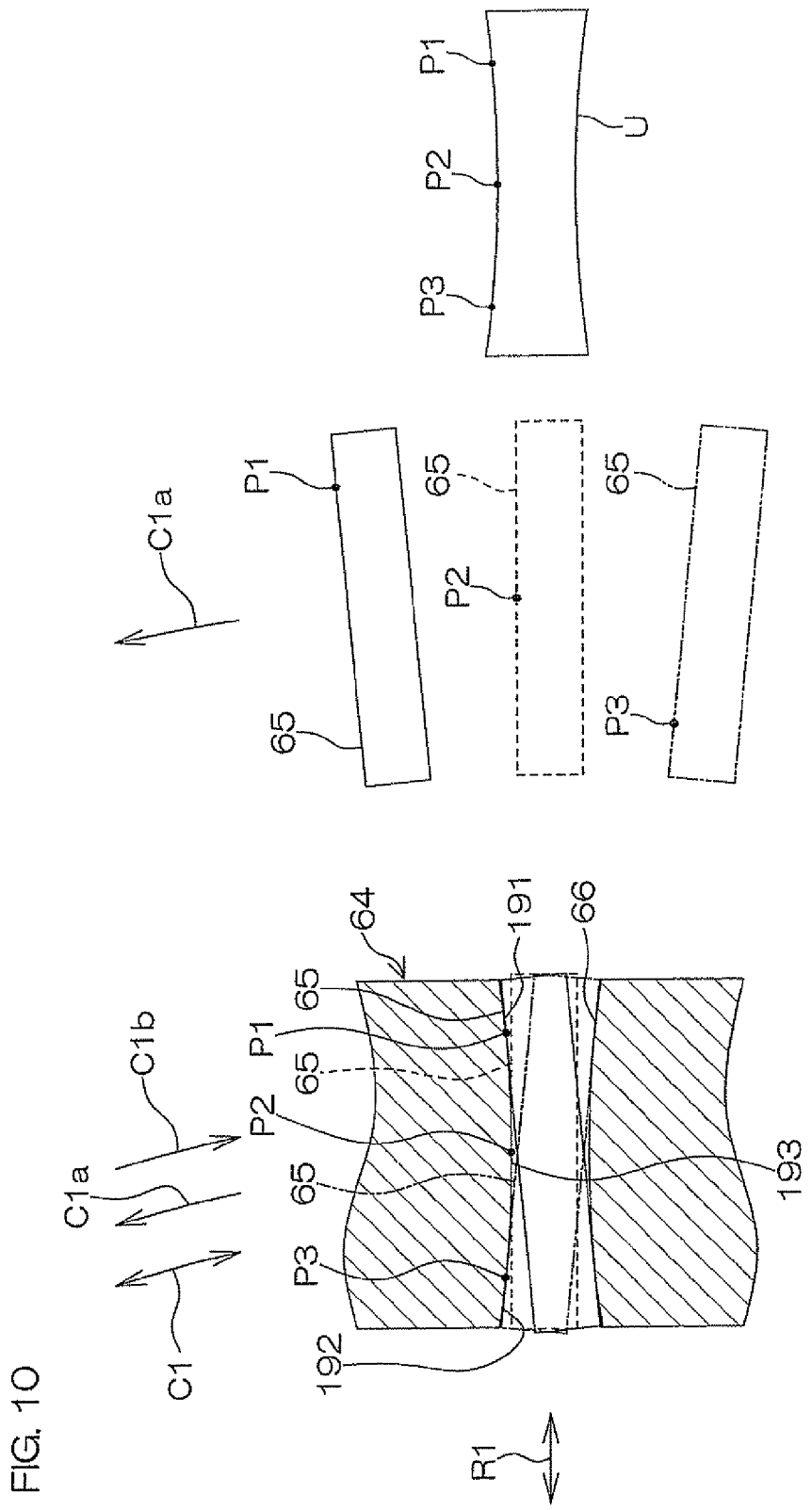

TRANSMISSION RATIO VARIABLE MECHANISM AND VEHICLE STEERING APPARATUS INCLUDING THE SAME

TECHNICAL FIELD

The present invention relates to a transmission ratio variable mechanism and a vehicle steering apparatus including the same.

BACKGROUND ART

Examples of a transmission include one using a swing gear (see. e.g., Patent Documents 1 and 2). Patent Document 1 discusses a reduction gear mechanism for obtaining a great reduction gear ratio. Patent document 2 discusses a steering angle ratio variable steering apparatus capable of changing a steering angle ratio.

PRIOR DOCUMENT

Patent Document

Patent Document 1: Japanese Unexamined Patent Publication No. 11-315908
Patent Document 2: Japanese Unexamined Patent Publication No. 2006-82718

DISCLOSURE OF THE INVENTION

Problems to be Solved by the Invention

In Patent Document 2, the transmission includes first and fourth gears opposed to each other, and a swing gear. The swing gear is arranged between the first and fourth gears, and inclined to the first and fourth gears. The swing gear includes a second gear meshing with the first gear, and a third gear meshing with the fourth gear.

The first gear is fixed to a housing, while the fourth gear is supported on a lower steering shaft. Since the first and fourth gears are thus respectively supported on different members, coaxiality between the first and fourth gears is easy to shift. A center deviation between the first and fourth gears causes a mesh between the first and second gears to deviate and a mesh between the third and fourth gears to deviate, and thus causes a meshing noise to increase.

Means for Solving the Problems

The present invention has been made under such a background, and is directed to providing a transmission ratio variable mechanism not easily cause a center deviation and a vehicle steering apparatus including the same.

In order to attain the above-mentioned object, in a preferred aspect of the present invention, a transmission ratio variable mechanism includes an input member and an output member arranged to rotate around a first axis, an intermediate member arranged to connect the input member and the output member so as to be differentially rotatable, and a motor arranged to drive the intermediate member. The motor includes a cylindrical rotor arranged to rotate around the first axis. An inner periphery of the rotor is arranged to support the intermediate member and arranged to rotatably support the input member and the output member via bearings, respectively.

According to this aspect, both the input member and the output member are supported on the inner periphery of the same rotor. This enables coaxiality between the input member and the output member to significantly increase, and can make it difficult for a center deviation between the input member and the output member to occur. As a result, each of an engagement between the intermediate member and the input member and an engagement between the intermediate member and the output member can be made similar to that in an ideal design state. Therefore, an inferior engagement between the intermediate member and the input member and an inferior engagement between the intermediate member and the output member can be suppressed. As a result, a driving noise of the transmission ratio variable mechanism can be significantly reduced. Moreover, the intermediate member, in addition to the input member and the output member, is supported on the inner periphery of the rotor. Thus, the intermediate member can be positioned with high precision with respect to the input member and the output member. As a result, the driving noise of the transmission ratio variable mechanism can be further reduced.

The intermediate member may include an inner ring having first and second end surfaces, and an outer ring arranged to rotatably support the inner ring via a rolling element and arranged to fit into the inner periphery of the rotor, a second axis serving as a center axis of the inner ring and the outer ring may be inclined to the first axis, the input member may include a first power transmission surface opposed to the first end surface of the inner ring, and the output member may include a second power transmission surface opposed to the second end surface of the inner ring. The transmission ratio variable mechanism may further include a first uneven engagement section arranged to engage the first end surface of the inner ring and the first power transmission surface of the input member so as to be power-transmittable, and a second uneven engagement section arranged to engage the second end surface of the inner ring and the second power transmission surface of the output member so as to be power-transmittable. The first uneven engagement section may include a first projection provided on one of the first end surface and the first power transmission surface, and a first recess provided on the other surface and arranged to engage with the first projection, and the second uneven engagement section may include a second projection provided on one of the second end surface and the second power transmission surface, and a second recess provided on the other surface and arranged to engage with the second projection.

In this case, a nutation gear mechanism is used as the transmission ratio variable mechanism. Thus, a range of a speed ratio of the output member to the input member can be significantly increased. An engagement between the first projection and the first recess causes power to be transmitted between the intermediate member and the input member. Thus, sliding can be inhibited from occurring between the intermediate member and the input member. As a result, in the first uneven engagement section, reliable power transmission can be achieved. Further, an engagement between the second projection and the second recess causes power to be transmitted between the intermediate member and the output member. Thus, sliding can be inhibited from occurring between the intermediate member and the output member. As a result, in the second uneven engagement section, reliable power transmission can be achieved.

The first projection may include a plurality of projections arranged along its annularly-arranged pitch surface, the first recess may include a plurality of recesses arranged along its annularly-arranged pitch surface, a part of the annularly-arranged pitch surface of the first projection and a part of the annularly-arranged pitch surface of the first recess may overlap each other, to form a first overlapping area, and the first overlapping area may extend in a direction perpendicular to the first axis.

In this case, when the input member moves in a direction perpendicular to the first axis relative to the inner ring, a position at which the first projection and the first recess mesh with each other does not move in an axial direction of the first axis. Thus, the input member and the inner ring can be prevented from relatively moving in the axial direction of the first axis. As a result, the first uneven engagement section can be prevented from vibrating in the axial direction of the first axis, so that vibration occurring in the first uneven engagement section can be significantly reduced.

The second projection may include a plurality of projections arranged along its annularly-arranged pitch surface, the second recess may include a plurality of recesses arranged along its annularly-arranged pitch surface, a part of the annularly-arranged pitch surface of the second projection and a part of the annularly-arranged pitch surface of the second recess may overlap each other, to form a second overlapping area, and the second overlapping area may extend in a direction perpendicular to the first axis.

In this case, when the output member moves in a direction perpendicular to the first axis relative to the inner ring, a position at which the second projection and the second recess mesh with each other does not move in an axial direction of the first axis. Thus, the output member and the inner ring can be prevented from relatively moving in the axial direction of the first axis. As a result, the second uneven engagement section can be prevented from vibrating in the axial direction of the first axis, so that vibration occurring in the second uneven engagement section can be significantly reduced.

The first projection may linearly extend in a radial direction of a surface on which the first projection is formed, the first recess may extend in a radial direction of a surface on which the first recess is formed, and the width of the first recess may narrow from one end of the first recess toward the center of the first recess, and may widen from the center of the first recess toward the other end of the first recess.

In this case, an engagement between the first projection and the first recess, which is caused by relative rotation between the intermediate member and the input member, can be significantly smoothed. Therefore, vibration occurring in the first uneven engagement section can be further reduced.

The second projection may linearly extend in a radial direction of a surface on which the second projection is formed, the second recess may extend in a radial direction of a surface on which the second recess is formed, and the width of the second recess may narrow from one end of the second recess toward the center of the second recess, and may widen from the center of the second recess toward the other end of the second recess.

In this case, an engagement between the second projection and the second recess, which is caused by relative rotation between the intermediate member and the output member, can be significantly smoothed. Therefore, vibration occurring in the second uneven engagement section can be further reduced.

The transmission ratio variable mechanism may further include an input shaft, and a first coupling arranged to connect the input member and the input shaft so as to be torque-transmittable, in which the first coupling may be a coupling that allows at least one of eccentricity and inclination between the first axis serving as a center axis of the input member and a center axis of the input shaft.

In this case, even when the center axis of the input member and the center axis of the input shaft are eccentrically arranged or inclinedly arranged due to assembling precision of each of components in the transmission ratio variable mechanism, for example, no unreasonable force is exerted between the input member and the input shaft. As a result, a force to reduce coaxiality between the input member and the output member can be inhibited from being exerted between the input member and the output member. Thus, an inferior engagement can be inhibited from occurring between the first projection and the first recess in the first uneven engagement section. Therefore, the driving noise of the transmission ratio variable mechanism can be reliably inhibited from increasing.

The transmission ratio variable mechanism may further include an output shaft, and a second coupling arranged to connect the output member and the output shaft so as to be torque-transmittable, in which the second coupling may be a coupling that allows at least one of eccentricity and inclination between the first axis serving as a center axis of the output member and a center axis of the output shaft.

In this case, even when the center axis of the output member and the center axis of the output shaft are eccentrically arranged or inclinedly arranged due to assembling precision of each of components in the transmission ratio variable mechanism, for example, no unreasonable force is exerted between the output member and the output shaft. As a result, a force to reduce coaxiality between the input member and the output member can be inhibited from being exerted between the input member and the output member. Thus, an inferior engagement can be inhibited from occurring between the second projection and the second recess in the second uneven engagement section. Therefore, the driving noise of the transmission ratio variable mechanism can be reliably inhibited from increasing.

The transmission ratio variable mechanism may further include a housing that houses the rotor, and two bearings arranged between the rotor and the housing and arranged to rotatably support the rotor, in which the two bearings may be arranged to sandwich the input member, the intermediate member, and the output member in an axial direction of the first axis.

In this case, the rotor is supported by the bearings at two points sufficiently spaced apart from each other in the axial direction of the first axis. Thus, strength with which the housing supports the rotor can be increased. Therefore, the rotor, the input member supported on the rotor, the intermediate member, and the output member can be reliably inhibited from vibrating.

A vehicle steering apparatus may include a steering member, a steerable wheel, and a transmission ratio variable mechanism arranged to change a transmission ratio serving as a ratio of a steered angle of the steerable wheel to a steering angle of the steering member, in which the above-mentioned transmission ratio variable mechanism may be used as the transmission ratio variable mechanism, the input member may connect to the steering member, and the output member may connect to the steerable wheel.

In this case, a center deviation between the input member and the output member does not easily occur, so that the driving noise of the transmission ratio variable mechanism can be reduced. Therefore, a vehicle steering apparatus superior in quietness can be implemented.

BRIEF DESCRIPTION OF THE DRAWINGS

FIG. 7A is a perspective view of a principal part of a first uneven engagement section, illustrating a first projection and a first recess spaced apart from each other.

FIG. 7B is a cross-sectional view illustrating a part of FIG. 7A.

FIG. 10 is a schematic view of a principal part for illustrating an example of an operation for engaging a first projection and a first recess in a first uneven engagement section.

BEST MODE FOR CARRYING OUT THE INVENTION

Preferred embodiments of the present invention will be described with reference to the accompanying drawings.

Figure 1:
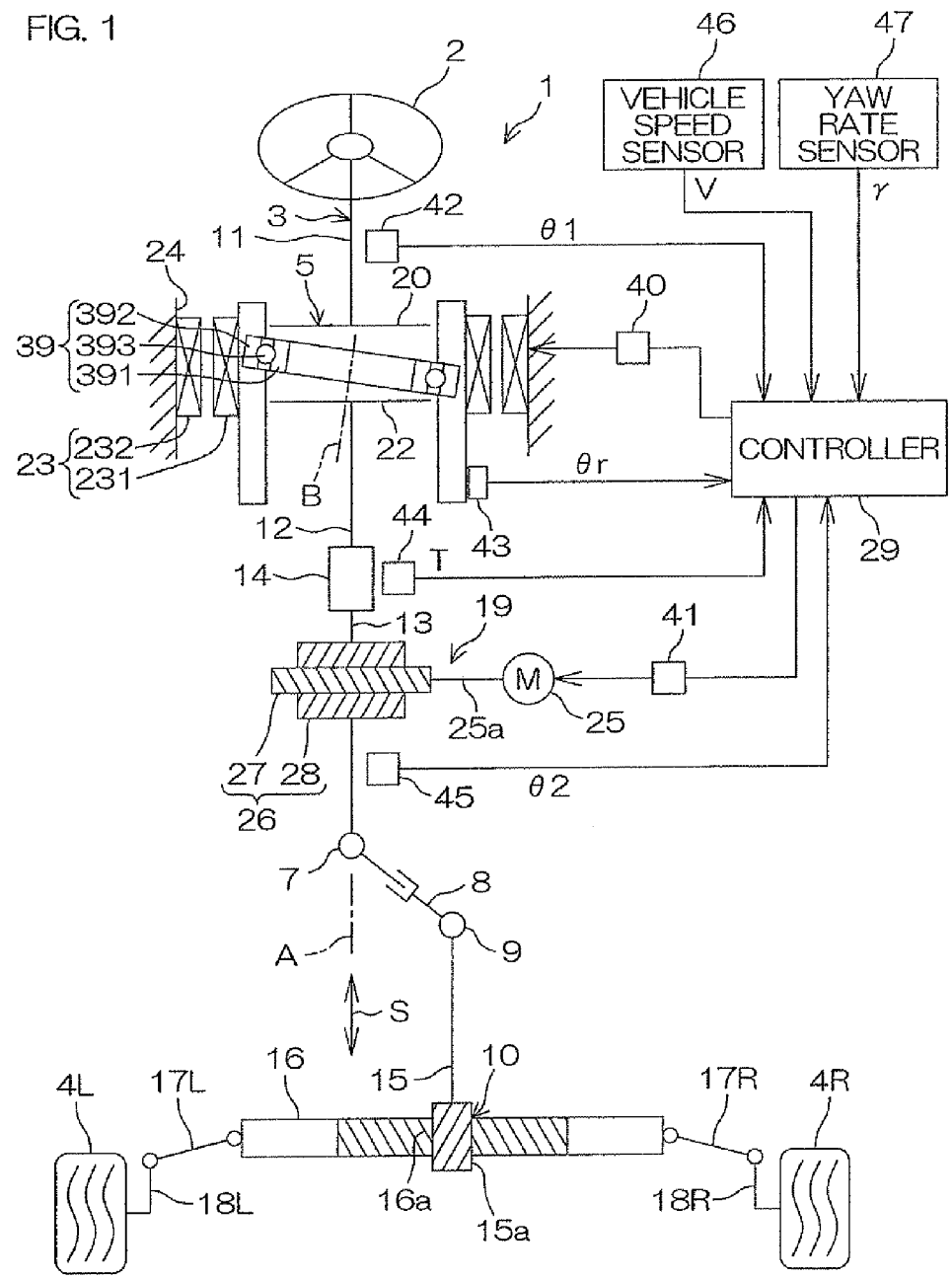
FIG. 1 is a schematic view illustrating a schematic configuration of a vehicle steering apparatus including a transmission ratio variable mechanism according to an embodiment of the present invention.

FIG. 1 is a schematic view illustrating a schematic configuration of a vehicle steering apparatus 1 including a transmission ratio variable mechanism according to an embodiment of the present invention. Referring to FIG. 1, the vehicle steering apparatus 1 applies a steering torque applied to a steering member 2 such as a steering wheel to each of right and left steerable wheels 4R and 4L via a steering shaft 3 or the like, to perform steering. The vehicle steering apparatus 1 has a variable gear ratio (VGR) function capable of changing a transmission ratio $\theta 2/\theta 1$ serving as a ratio of a steered angle $\theta 2$ of the steerable wheel to a steering angle $\theta 1$ of the steering member 2.

The vehicle steering apparatus 1 includes the steering member 2 and the steering shaft 3 connecting to the steering member 2. The steering shaft 3 includes first to third shafts 11 to 13 arranged coaxially with one another. A center axis of the first to third shafts 11 to 13 is also a rotation axis of the first to third shafts 11 to 13.

The steering member 2 is connected to one end of the first shaft 11 so as to be rotatable together. The other end of the first shaft 11 and one end of the second shaft 12 are connected to each other via a transmission ratio variable mechanism 5 so as to be differentially rotatable. The other end of the second shaft 12 and one end of the third shaft 13 are elastically connected to each other so as to be relatively rotatable and power-transmittable within a predetermined range via a torsion bar 14.

The other end of the third shaft 13 connects to steerable wheels 4L and 4R via a flexible joint 7, an intermediate shaft 8, a flexible joint 9, and a steering mechanism 10 or the like.

The steering mechanism 10 includes a pinion shaft 15 connecting to the flexible joint 9, and a rack shaft 16 having a rack 16a meshing with a pinion 15a at a leading end of the pinion shaft and serving as a steering shaft extending in a right-to-left direction of the vehicle. Knuckle arms 18R and 18L are respectively connected to a pair of ends of the rack shaft 16 via tie rods 17R and 17L.

According to the above-mentioned configuration, rotation of the steering member 2 is transmitted to the steering mechanism 10 via the steering shaft 3 or the like. In the steering mechanism 10, rotation of the pinion 15a is converted into axial motion of the rack shaft 16. The axial motion of the rack shaft 16 is transmitted via the tie rods 17R and 17L to the corresponding knuckle arms 18R and 18L. Thus, the knuckle arms 18R and 18L respectively rotate. Thus, the respective directions of the steerable wheels 4R and 4L connected to the corresponding knuckle arms 18R and 18L are changed.

The transmission ratio variable mechanism 5 is a nutation gear mechanism arranged to change a rotation transmission ratio (transmission ratio $\theta 2/\theta 1$) between the first and second shafts 11 and 12 in the steering shaft 3. The transmission ratio variable mechanism 5 includes an input member 20 provided at the other end of the first shaft 11, an output member 22 provided at one end of the second shaft 12, and a bearing ring unit 39 serving as an intermediate member interposed between the input member 20 and the output member 22.

The input member 20 is connected to the steering member 2 and the first shaft 11 so as to be torque-transmittable. The output member 22 is connected to the second shaft 12 so as to be torque-transmittable. A first axis A is also a center axis and a rotation axis of the input member and the output member 22.

The output member 22 connects to the steerable wheels 4R and 4R via the second shaft 12 and the steering mechanism 10 or the like.

The bearing ring unit 39 includes an inner ring 391 serving as a first bearing ring, an outer ring 392 serving as a second bearing ring, and a rolling element 393 such as a ball interposed between the inner ring 391 and the outer ring 392. The bearing ring unit 39 is formed using a ball bearing.

As the rolling element 393, a cylindrical roller, a needle roller, and a conical roller can be used instead of the ball. The rolling element 393 may be arranged in a single row, or may be arranged in a double row. If the rolling element 393 is arranged in a double row, the inner ring 391 can be prevented from inclining with respect to the outer ring 392. An example of a bearing having the rolling element 393 arranged in a double row is a double-row angular bearing.

The inner ring 391 connects the input member 20 and the output member 22 so as to be differentially rotatable. The inner ring 391 and the outer ring 392 have a second axis B serving as a center axis inclined to the first axis A. The second axis B is inclined at a predetermined angle of inclination to the first axis A. The inner ring 391 is rotatable around the second axis B by being rotatably supported on the outer ring 392 via the rolling element 393. The inner ring 391 is rotatable around the first axis A as a motor for the transmission ratio variable mechanism (hereinafter referred to as a transmission ratio variable mechanism motor) 23 serving as an electric motor (an actuator) arranged to drive the outer ring 392 is driven. The inner ring 391 and the outer ring 392 can perform Coriolis motion (swing motion) around the first axis A.

The transmission ratio variable mechanism motor 23 is arranged outside in a radial direction of the bearing ring unit 39, and the first axis A is a center axis. The transmission ratio variable mechanism motor 23 changes a transmission ratio θ2/θ1 by changing the speed of rotation of the outer ring 392 around the first axis A.

The transmission ratio variable mechanism motor 23 is composed of a brushless motor, for example. The transmission ratio variable mechanism motor 23 includes a rotor 231 arranged to hold the outer ring 392 in the bearing ring unit 39, and a stator 232 surrounding the rotor 231 while being fixed to a housing 24 serving as a steering column. The rotor 231 rotates around the first axis A.

The vehicle steering apparatus 1 includes a steering assist force application mechanism 19 arranged to apply a steering assist force to the steering shaft 3. The steering assist force application mechanism 19 includes the second shaft 12 serving as an input shaft connecting to the output member 22 in the transmission ratio variable mechanism 5, the third shaft 13 serving as an output shaft connecting to the steering mechanism 10, a torque sensor 44 arranged to detect a torque to be transmitted to an area between the second shaft 12 and the third shaft 13, a steering assist motor 25 serving as a second actuator for steering assist, and a reduction gear mechanism interposed between the steering assist motor and the third shaft 13.

The steering assist motor 25 generates a steering assist force, and includes an electric motor such as a brushless motor. An output of the steering assist motor 25 is transmitted to the third shaft 13 via the reduction gear mechanism 26.

The reduction gear mechanism 26 is a worm gear mechanism, for example, and includes a worm shaft 27 serving as a driving gear connected to an output shaft 25a in the steering assist motor 25, and a worm wheel 28 meshing with the worm shaft 27 and serving as a driven gear connected to the third shaft 13 so as to be rotatable together. The reduction gear mechanism 26 is not limited to the worm gear mechanism 26. For example, other gear mechanisms such as a gear pair mechanism with parallel axes using a spur gear and a helical gear may be used.

The transmission ratio variable mechanism 5 and the steering assist force application mechanism 19 are provided in the housing 24. The housing 24 is arranged in a cabin of the vehicle. The housing 24 may be arranged to surround the intermediate shaft 8, or may be arranged in an engine room of the vehicle.

Driving of each of the transmission ratio variable mechanism motor 23 and the steering assist motor 25 is controlled by a controller 29 including a central processing unit (CPU), a random access memory (RAM), and a read-only memory (ROM). The controller 29 is connected to the transmission ratio variable mechanism motor 23 via a driving circuit 40 while being connected to the steering assist motor 25 via a driving circuit 41.

Each of a steering angle sensor 42, a motor resolver 43 serving as rotation angle detection device arranged to detect a rotation angle of the transmission ratio variable mechanism motor 23, the torque sensor 44 serving as torque detection device, a steered angle sensor 45, a vehicle speed sensor 46, and a yaw rate sensor 47 is connected to the controller 29.

A signal relating to a rotation angle of the first shaft 11 is input from the steering angle sensor 42 to the controller 29 as a value corresponding to a steering angle θ1 serving as an operation amount from a position at which the steering member 2 travels straight.

A signal relating to a rotation angle θr of the rotor 231 in the transmission ratio variable mechanism motor 23 is input from the motor resolver to the controller 29.

A signal relating to a torque exerted between the second and third shafts 12 and 13 is input as a value corresponding to a steering torque T exerted on the steering member 2 from the torque sensor 44 to the controller 29.

A signal relating to a rotation angle of the third shaft 13 is input as a value corresponding to a steered angle θ2 from the steered angle sensor 45 to the controller 29.

A signal relating to a vehicle speed V is input from the vehicle speed sensor 46 to the controller 29.

A signal relating to a yaw rate γ of the vehicle is input from the yaw rate sensor 47 to the controller 29.

The controller 29 controls the transmission ratio variable mechanism motor 23 and the steering assist motor 25 based on a signal of each of the sensors 42 to 47.

According to the above-mentioned configuration, an output of the transmission rate variable mechanism 5 is transmitted to the steering mechanism 10 via the steering assist force application mechanism 19. More specifically, the steering torque input to the steering member 2 is input to the input member 20 in the transmission ratio variable mechanism 5 via the first shaft 11, and is transmitted to the second shaft 12 in the steering assist force application mechanism 19 from the output member 22.

The steering torque transmitted to the second shaft 12 is transmitted to the torsion bar and the third shaft 13, is combined with an output from the steering assist motor 25, and is further transmitted to the steering mechanism 10 via the intermediate shaft 8 or the like.

Figure 2:
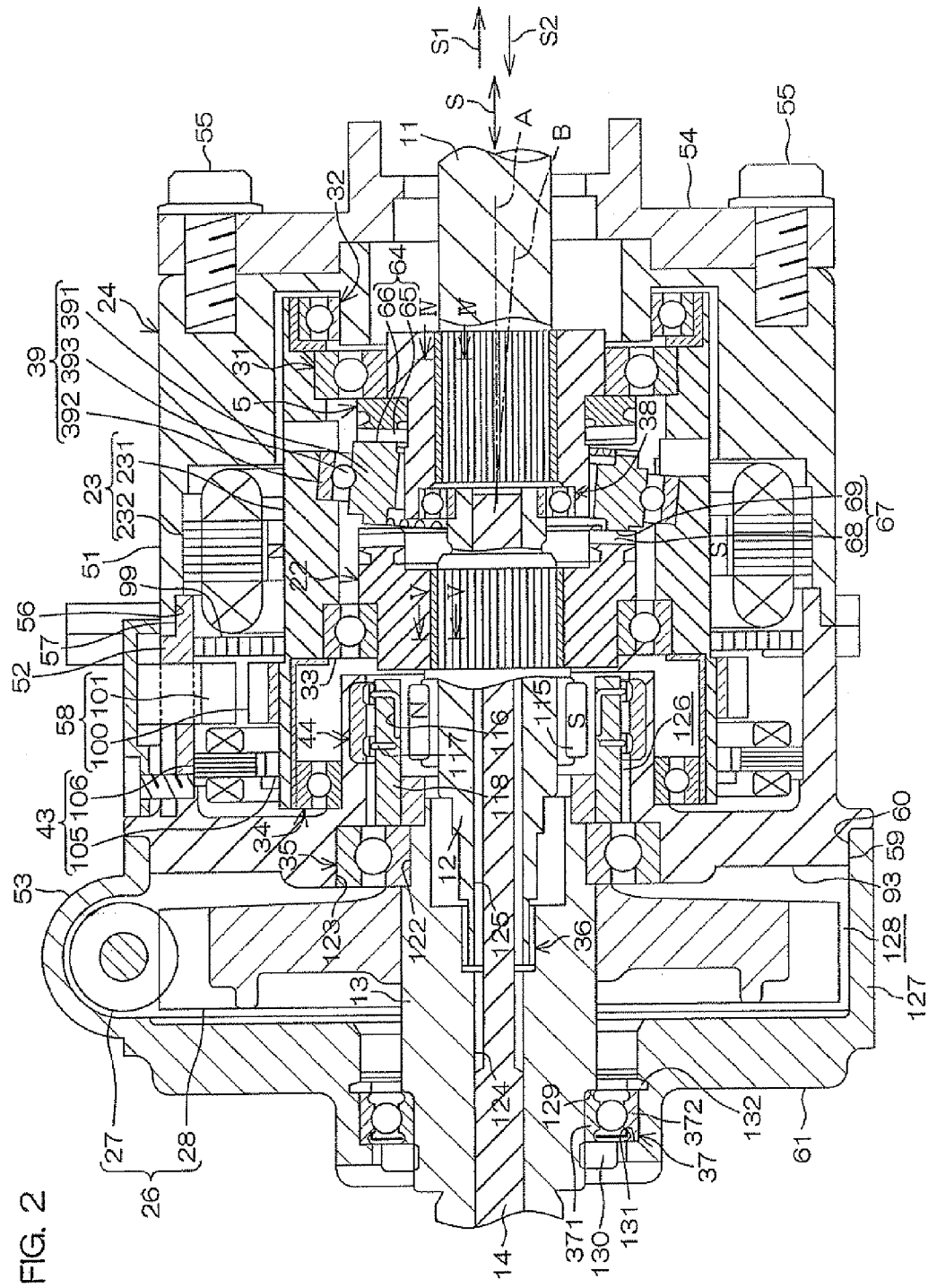
FIG. 2 is a cross-sectional view illustrating a more schematic configuration of a principal part of FIG. 1.

FIG. 2 is a cross-sectional view illustrating a more schematic configuration of a principal part of FIG. 1. Referring to FIG. 2, the housing 24 is formed in a cylindrical shape of a metal such as an aluminum alloy or the like, for example. The housing 24 includes first to third housings 51 to 53. The housing 24 houses first to eighth bearings 31 to 38. Each of the first to fifth bearings 31 to 35 and seventh and eighth bearings 37 and 38 is a rolling bearing such as an angular contact ball bearing. A sixth bearing 36 is a rolling bearing such as a needle roller bearing.

The first housing 51 has a cylindrical shape, and constitutes a differential mechanism housing that houses the transmission ratio variable mechanism 5 serving as a differential mechanism while constituting a motor housing that houses the transmission ratio variable mechanism motor 23. One end of the first housing 51 is covered with an end wall member 54. One end of the first housing 51 and the end wall member 54 are fixed to each other using a fastening member such as a bolt. An annular projection 57 at one end of the second housing 52 is fitted into an inner peripheral surface 56 at the other end of the first housing 51. The first and second housings 51 and 52 are fixed to each other using a fastening member (not illustrated) such as a bolt.

The second housing 52 has a cylindrical shape, and constitutes a sensor housing that houses the torque sensor 44 and a resolver housing that houses the motor resolver 43. The second housing 52 houses a bus bar 99, described below, in the transmission ratio variable mechanism motor 23 while housing a locking mechanism 58 arranged to lock the rotor 231 in the transmission ratio variable mechanism motor 23. An inner peripheral surface 60 at one end of the third housing 53 is fitted into an outer peripheral surface 59 at the other end of the second housing 52.

The third housing 53 has a cylindrical shape, and constitutes a reduction gear mechanism housing that houses the reduction gear mechanism 26. An end wall section 61 is provided at the other end of the third housing 53. The end wall section 61 has an annular shape, and covers the other end of the third housing 53.

Figure 3:
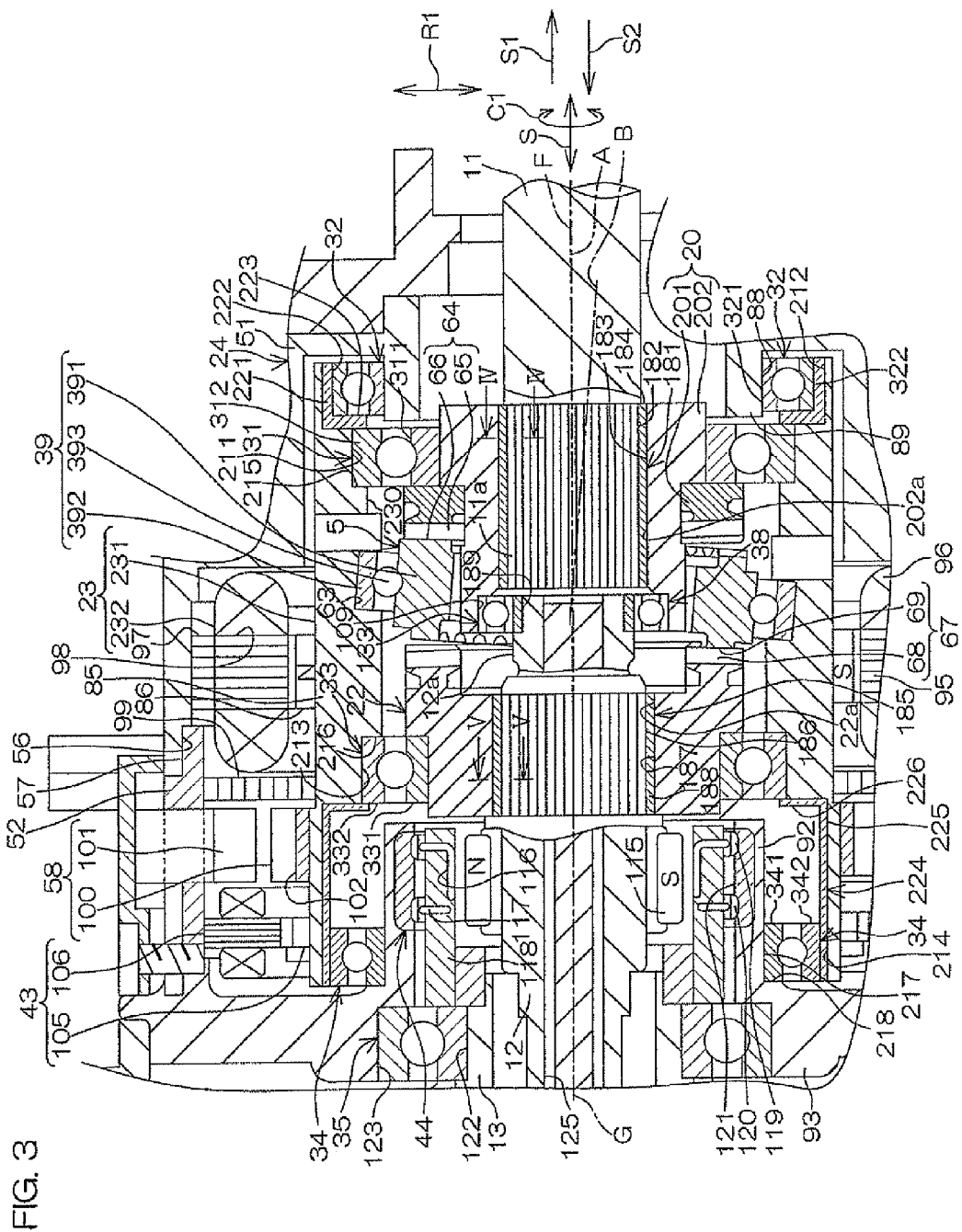
FIG. 3 is an enlarged view of the transmission ratio variable mechanism illustrated in FIG. 2 and its surroundings.

FIG. 3 illustrates an enlarged view of the transmission ratio variable mechanism illustrated in FIG. 2 and its surroundings. Referring to FIG. 3, each of the input member 20 and the output member 22 in the transmission ratio variable mechanism 5, and the inner ring 391 in the bearing ring unit 39 has an annular shape.

The input member 20 includes an input member main body 201, and a cylindrical member 202. The cylindrical member 202 is arranged inside in a radial direction of the input member main body 201, and is connected to the input member main body 201 so as to be rotatable together.

The other end of the first shaft 11 is inserted through an insertion hole 202a in the cylindrical member 202. The other end of the first shaft 11 serving as an input shaft of the transmission ratio variable mechanism 5 and the cylindrical member 202 are connected to each other by a first coupling 181 so as to be torque-transmittable, so as to be capable of being eccentric, and so as to be capable of being inclined. That is, the first coupling 181 enables a center axis F of the first shaft 11 and the first axis A to be eccentric and to be inclined.

Figure 4:
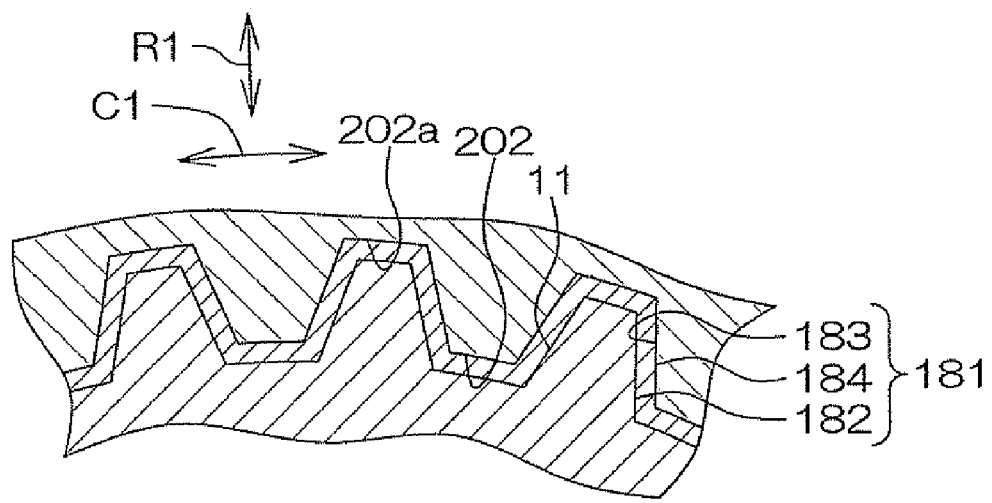
FIG. 4 is a cross-sectional view taken along a line IV-IV illustrated in FIG. 3.

FIG. 4 is a cross-sectional view taken along a line IV-IV illustrated in FIG. 3. Referring to FIGS. 3 and 4, the first coupling 181 includes a male spline 182 formed at the other end of the first shaft 11, a female spline 183 formed on the inner periphery of the insertion hole 202a in the cylindrical member 202, and a cylindrical elastic member 184 interposed between the male spline 182 and the female spline 183.

The male spline 182 and the female spline 183 are formed over the whole area in a circumferential direction of the corresponding first shaft 11 and cylindrical member 202. The male spline 182 and the female spline 183 are splined to engage with each other via the elastic member 184.

The elastic member 184 is formed using a material that is higher in elasticity than the first shaft 11 and the cylindrical member 202, for example, synthetic resin or rubber. The elastic member 184 is sandwiched between the male spline 182 and the female spline 183 in both a radial direction R1 and a circumferential direction C1 of the steering shaft 3.

Referring to FIG. 3, an intermediate portion of the second shaft 12 is inserted through an insertion hole 22a in the output member 22. The intermediate portion of the second shaft 12 serving as an output shaft of the transmission ratio variable mechanism 5 and the output member are connected to each other by the second coupling 185 so as to be torque-transmittable, so as to be capable of being eccentric, and so as to be capable of being inclined. That is, the second coupling 185 enables a center axis G of the second shaft 12 and the first axis A to be eccentric and inclined.

Figure 5:
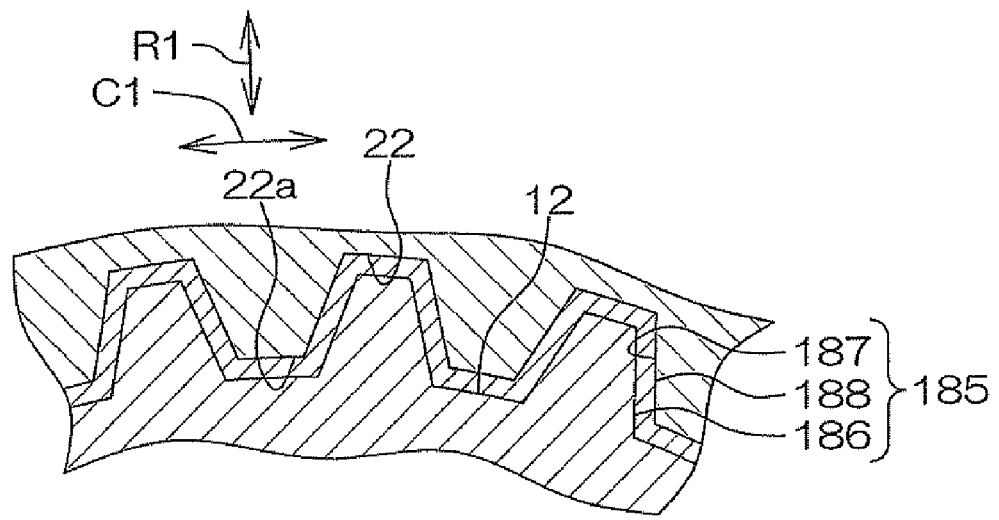
FIG. 5 is a cross-sectional view taken along a line V-V illustrated in FIG. 3.

FIG. 5 is a cross-sectional view taken along a line V-V illustrated in FIG. 3. Referring to FIGS. 3 and 5, the second coupling 185 includes a male spline 186 formed in the intermediate portion of the second shaft 12, a female spline 187 formed on the inner periphery of the insertion hole 22a in the output member 22, and a cylindrical elastic member 188 interposed between the male spline 186 and the female spline 187.

The male spline 186 and the female spline 187 are formed over whole areas in a circumferential direction of the corresponding second shaft 12 and output member 22. The male spline 186 and the female spline 187 are splined to engage with each other via the elastic member 188.

The elastic member 188 is formed using a similar material to that forming the elastic member 184. The elastic member 188 is sandwiched between the male spline 186 and the female spline 187 in both the radial direction R1 and the circumferential direction C1 of the steering shaft 3.

Referring to FIG. 3, respective opposite ends 11a and 12a of the first shaft 11 and the second shaft 12 are supported by a supporting mechanism 133 coaxially and so as to be relatively rotatable. The supporting mechanism 133 includes the cylindrical member 202, an eighth bearing 38, and an annular elastic member 189. The cylindrical member 202 constitutes a part of the input member 20 while constituting a part of the supporting mechanism 133.

The cylindrical member 202 surrounds the respective opposite ends 11a and 12a of the first and second shafts 11 and 12.

A bearing holding hole 109 for the eighth bearing 38 is formed at the other end of the cylindrical member 202. The opposite end 12a of the second shaft 12 is inserted through the bearing holding hole 109. The annular elastic member 189 is fitted into an outer peripheral surface of the opposite end 12a. The annular elastic member 189 allows eccentricity and inclination between the center axis G of the second shaft 12 and the center axis F of the first shaft 11. The eighth bearing is interposed between the annular elastic member 189 and the bearing holding hole 109. The eighth bearing 38 allows relative rotation between the cylindrical member 202 and the second shaft 12.

The output member 22 may extend toward the input member 20, and the eighth bearing 38 and the elastic member 189 may be interposed between the output member 22 and the opposite ends 11a of the first shaft 11.

The inner ring 391 in the bearing ring unit is arranged outside in a radial direction of the cylindrical member 202. An outer ring 392 is press-fitted and fixed to an inclined hole 63 formed in an inner peripheral section 230 in the rotor 231 in the transmission ratio variable mechanism motor 23. The outer ring 392, together with the rotor 231, rotates around the first axis A. Relative movement between the outer ring 392 and the rotor 231 is regulated in an axial direction S of the steering shaft 3.

As the rotor 231 rotates around the first axis A, the bearing ring unit 39 performs Coriolis motion.

The outer ring 392 may connect the input member 20 and the output member 22 so as to be differentially rotatable while the inner ring 391 may be connected to the rotor 231 in the transmission ratio variable mechanism motor 23 so as to be rotatable together. In this case, the bearing ring unit 39 is of an inner ring support type.

Figure 6:
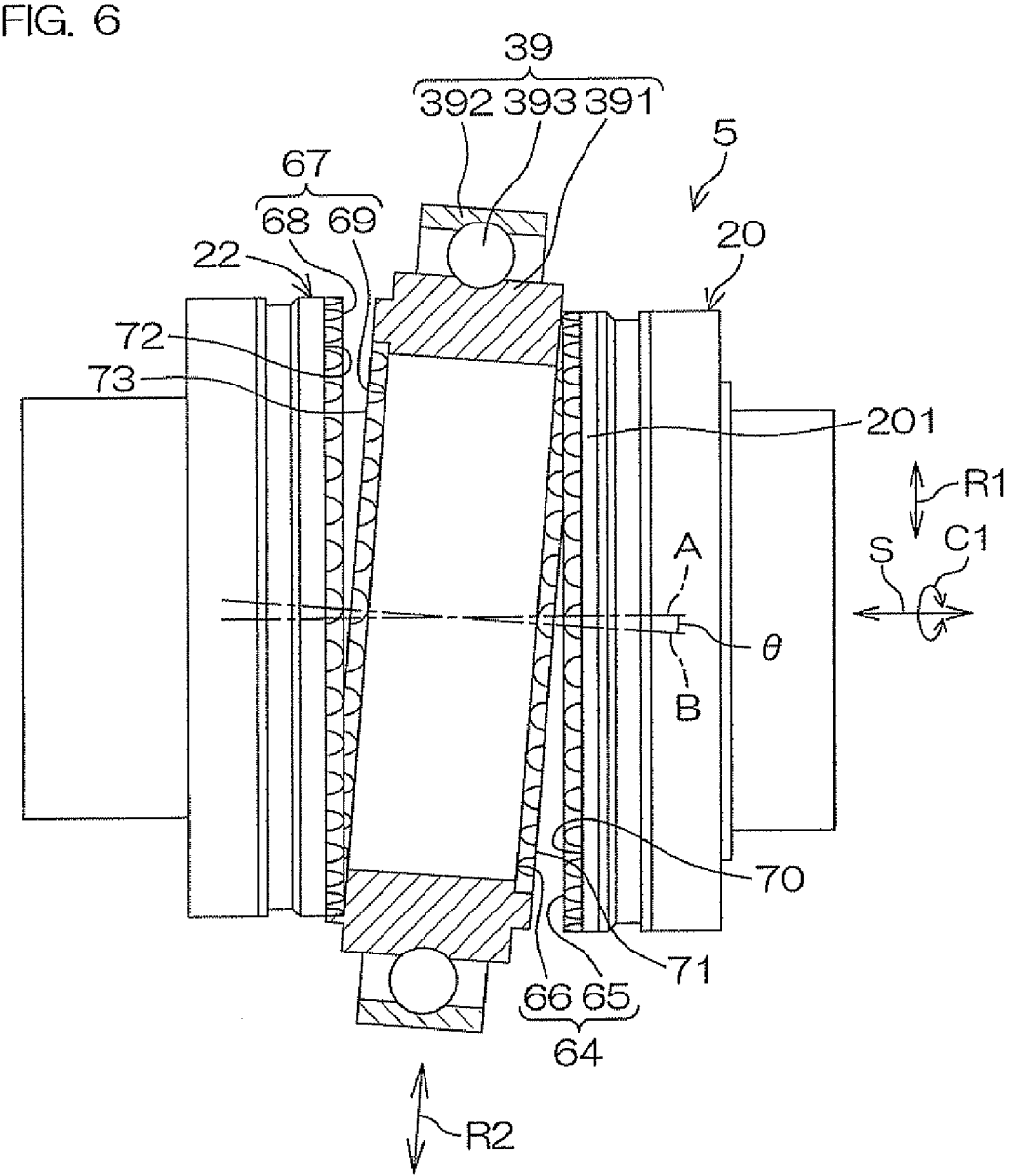
FIG. 6 is a side view illustrating a principal part of a transmission ratio variable mechanism in cross section.

FIG. 6 is a side view representing a principal part of the transmission ratio variable mechanism 5 in cross section. In FIG. 6, a side surface is illustrated for the input member 20 and the output member 22, and a cross section is illustrated for the bearing ring unit 39. The inner ring 391 in the bearing ring unit 39 is formed using a single member as a whole.

One end surface, opposed to the input member 20, of the inner ring 391 is a first end surface 71 of the inner ring 391.

The other end surface, opposed to the output member 22, of the inner ring 391 is a second end surface 73 of the inner ring 391.

A first uneven engagement section 64 is provided in each of the input member main body 201 and the inner ring 391. This enables power to be transmitted between the input member 20 and the inner ring 391. Each of the inner ring 391 and the output member 22 is provided with a second uneven engagement section 67. This enables power to be transmitted between the inner ring 391 and the output member 22.

The first uneven engagement section 64 includes a first projection 65 formed on a first power transmission surface 70 serving as one end surface of the input member main body 201, and a first recess 66 formed on the first end surface 71 of the inner ring 391 and arranged to engage with the first projection 65.

The first projection 65 and the first recess 66 are respectively formed on the whole areas in circumferential directions of the corresponding first power transmission surface 70 and first end surface 71.

The first power transmission surface 70 and the first end surface 71 are opposed to each other in the axial direction S of the steering shaft 3 (hereinafter merely referred to as the axial direction S). The first uneven engagement section engages the first power transmission surface and the first end surface 71 so as to be power-transmittable.

The number of first projections 65 is 38, for example. The number of first recesses 66 differs from the number of first projections 65. Differential rotation can be generated between the input member main body 201 and the inner ring 391 depending on a difference between the number of first projections 65 and the number of first recesses 66.

FIG. 7A is a perspective view of a principal part of the first uneven engagement section 64, illustrating the first projection 65 and the first recess 66 spaced apart from each other. FIG. 7B is a cross-sectional view illustrating a part of FIG. 7A.

Referring to FIGS. 7A and 7B, the first projection 65 is formed over the whole area in the radial direction R1 of the steering shaft 3 (hereinafter merely referred to as the radial direction R1) in the first power transmission surface 70 of the input member main body 201. In other words, the first projection 65 is formed over the whole area of the first power transmission surface 70 in a radial direction R3 of the input member 20 (the output member 22). The first projection 65 has a similar cross-sectional shape (a semi-circular shape in cross section) at its any points in the radial direction R3. The first projection 65 extends linearly in the radial direction R3.

The first recesses 66 extend in a radial direction R2 of the inner ring 391 on the first end surface 71 of the inner ring 391, and is formed over the whole area in the radial direction R2. Each of the first recesses 66 has a constricted shape when viewed in an axial direction of the inner ring 391. Both ends, in the radial direction R2 of the inner ring 391, of each of the first recesses 66 form wide sections 191 and 192 while an intermediate portion of the first recess 66 is constricted to form a narrow section 193. The narrow section 193 is arranged at a substantially center of each of the first recesses 66 in the radial direction R2 of the inner ring 391. The width of the narrow section 193 is substantially similar to the width of the first projection 165. The width of each of the first recesses 66 narrows toward the narrow section 193 from the wide section 191 in the first recess 66. The width of each of the first recesses 66 widens toward the wide section 192 from the narrow section 193 in the first recess 66.

Referring to FIG. 6 again, a second axis B of the inner ring 391 is inclined by a predetermined angle θ to the first axis A of the input member 20 and the output member 22 so that some of the first projections 65 and some of the first recesses 66 mesh with each other.

Figure 8:
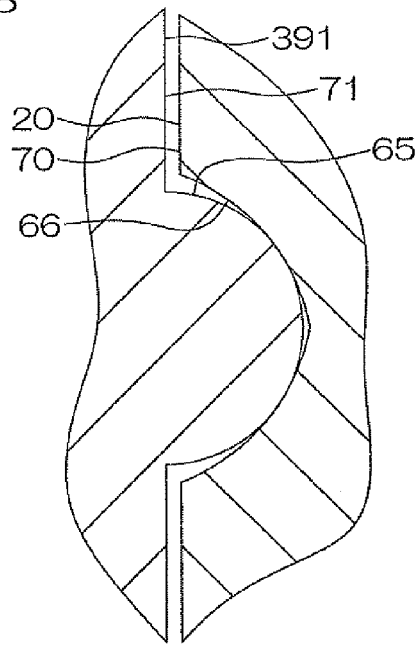
FIG. 8 is a cross-sectional view of a principal part illustrating another embodiment of a uneven engagement section.

As illustrated in FIG. 8, an arrangement of the first projection 65 and an arrangement of the first recess 66 may be replaced with each other. In this case, the first projection 65 is formed on the first end surface 71 of the inner ring 391, and the first recess 66 is formed on the first power transmission surface 70 of the input member 20.

Referring to FIG. 6 again, the second uneven engagement section 67 includes a second projection 68 formed on the second power transmission surface 72 serving as one end surface of the output member 22, and a second recess 69 formed on the second end surface 73 of the inner ring 391 and arranged to engage with the second projection 68. The second transmission surface and the second end surface 73 are opposed to each other in the axial direction S. The second uneven engagement section 67 engages the second power transmission surface 72 and the second end surface 73 so as to be power-transmittable.

The second projection 68 in the second uneven engagement section 67 has a similar configuration to the first projection 65 in the first uneven engagement section 64, and the second recess 69 has a similar configuration to the first recess 66. More specifically, the second power transmission surface 72 of the output member 22 has a similar configuration to the first power transmission surface 70 of the input member main body 201, and the second end surface 73 of the inner ring 391 has a similar configuration to the first end surface 71 of the inner ring 391. Therefore, description of details of the second uneven engagement section 67 is not repeated.

Figure 9:
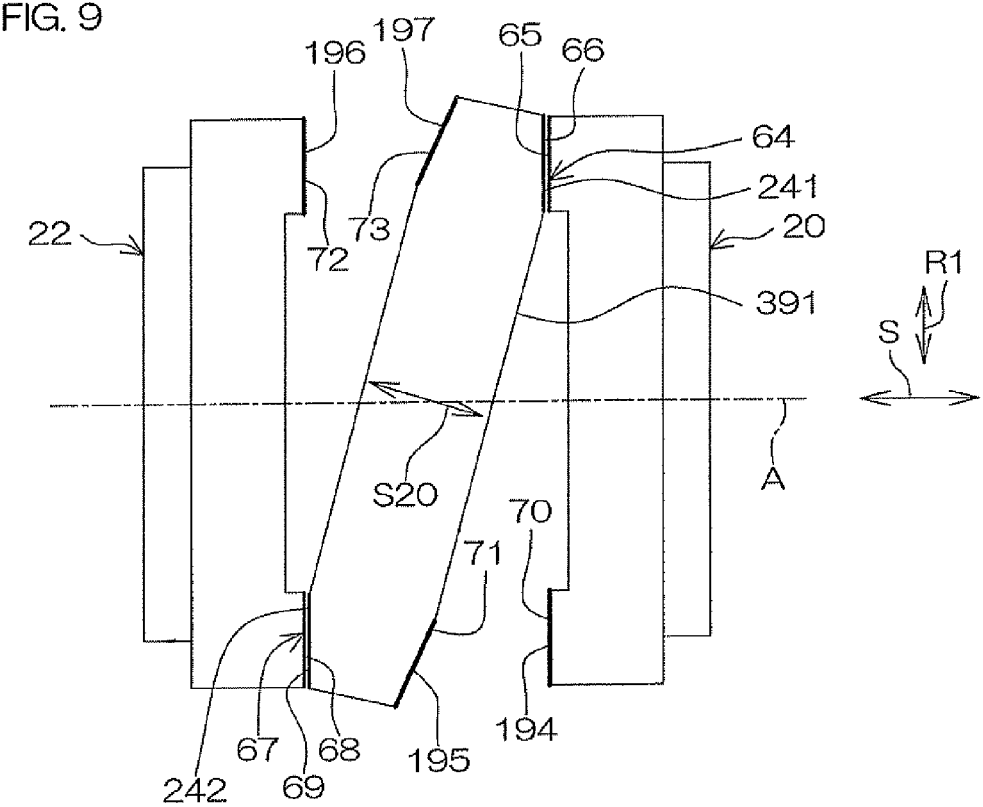
FIG. 9 is a schematic side view of a principal part for illustrating each of an engagement between a first projection and a first recess in a first uneven engagement section and an engagement between a second projection and a second recess in a second uneven engagement section.

FIG. 9 is a schematic side view of a principal part for illustrating each of an engagement between the first projection 65 and the first recess 66 in the first uneven engagement section 64 and an engagement between the second projection 68 and the second recess 69 in the second uneven engagement section 67.

Referring to FIG. 9, each of the first projections 65 is formed along a predetermined annularly-arranged pitch surface 194. The annularly-arranged pitch surface 194 is formed in a flat annular shape. Each of the first recesses is formed along a predetermined annularly-arranged pitch surface 195 as a whole. The annularly arranged pitch surface 195 is formed in a circular truncated conical shape, and is tapered toward the input member 20 from the inner ring 391 in an axial direction S20 of the inner ring 391. Respective parts of the annularly-arranged pitch surfaces 194 and 195 overlap each other, to form a first overlapping area 241. The first overlapping area 241 is an engagement area between the first projection 65 and the first recess 66.

Similarly, each of the second projections 68 is formed along a predetermined annularly-arranged pitch surface 196 as a whole. The annularly arranged pitch surface 196 is formed in a flat annular shape. Each of the second recesses 69 is formed along a predetermined annularly-arranged pitch surface 197 as a whole. The annularly-arranged pitch surface 197 is formed in a circular truncated conical shape, and is tapered toward the output member 22 from the inner ring 391 in the axial direction S20 of the inner ring 391. Respective parts of the annularly-arranged pitch surfaces 196 and 197 overlap each other, to form a second overlapping area 242. The second overlapping area 242 is an engagement area between the second projection 68 and the second recess 69.

The annularly-arranged pitch surfaces 194 and 196 may be conical surfaces.

The first overlapping area 241 extends in the radial direction R1 (radial direction R3) perpendicular to the first axis A.

Similarly, the second overlapping area 242 extends in the radial direction R1 (radial direction R3) perpendicular to the first axis A. Thus, the first overlapping area 241 and the second overlapping area 242 are parallel to each other.

According to the above-mentioned configuration, even when the input member 20 moves in the radial direction R1 of the steering shaft relative to the inner ring 391, the first overlapping area 241 does not move in the axial direction S. Thus, the input member 20 and the inner ring 391 can be prevented from relatively moving in the axial direction S. As a result, the first uneven engagement section 64 can be prevented from vibrating in the axial direction S, so that vibration in the first uneven engagement section 64 can be significantly reduced.

Similarly, even when the output member 22 moves in the radial direction R1 of the steering shaft 3 relative to the inner ring 391, the second overlapping area 242 does not move in the axial direction S. Thus, the output member 22 and the inner ring 391 can be prevented from relatively moving in the axial direction S. As a result, the second uneven engagement section 67 can be prevented from vibrating in the axial direction S, so that vibration in the second uneven engagement section 67 can be significantly reduced.

FIG. 10 is a schematic view of a principal part for illustrating an example of an operation for engaging the first projection 65 and the first recess 66 in the first uneven engagement section 64. The left of FIG. 10 illustrates how the first projection 65 and the first recess 66 mesh with each other. The center of FIG. 10 illustrates an operation of the one first projection 65. The right of FIG. 10 illustrates a trajectory drawn by a contour of the first projection 65.

Referring to FIG. 10, when the input member 20 rotates toward one side C1a of the circumferential direction C1 so that the first projection 65 engages with the first recess 66, a position P1 outside in the radial direction R1 of the first projection 65 contacts the corresponding wide section 191 in the first recess 66.

A contact position of the first projection 65 with the first recess 66 continuously moves inward in the radial direction R1. Thus, the first projection 65 contacts the narrow section 193 in the first recess 66 at a central position P2 in the radial direction R1 (the first projection 65 in this state is indicated by a broken line in FIG. 10). Further, the contact position of the first projection 65 with the first recess 66 continuously moves inward in the radial direction R1. Thus, an inner position P3 in the radial direction R1 of the first projection 65 contacts the corresponding wide section 192 in the first recess 66 (the first projection 65 in this state is indicated by a two-dot and dash line in FIG. 10). Then, the first projection 65 is spaced apart from the corresponding first recess 66.

The trajectory of movement of the contour of the first projection 65 is in a constricted shape U illustrated in FIG. 10 in a simplified manner when viewed in the axial direction S20 of the inner ring 391. The constricted shape U substantially matches the shape of the first recess 66 (see FIG. 7B) when viewed in the axial direction S20 of the inner ring 391.

Referring to FIG. 10, even when the input member 20 rotates toward the other side C1b of the circumferential direction C1, an operation similar to the above-mentioned operation is also performed. More specifically, the first projection 65 contacts the first recess 66 from an outer portion of the first projection 65 in the radial direction R1, and an inner portion of the first projection 65 gradually contacts the first recess 66.

When the output member 22 respectively rotates toward one side C1a and the other side C1b of the circumferential direction C1, the second projection 68 and the second recess 69 operate in a similar manner to the above.

Referring to FIG. 6, according to the above-mentioned configuration, elastic contact between the first projection 65 and the first recess 66 is achieved. A pre-load is applied, as described below, between the first projection 65 and the first recess 66. Even when the input member 20 moves in the radial direction R1 relative to the inner ring 391 in the bearing ring unit 39, therefore, an engagement between the first projection 65 and the first recess 66 is well-fitted. As a result, an inferior engagement does not occur between the first projection 65 and the first recess 66.

Similarly, elastic contact between the second projection 68 and the second recess 69 is achieved. A pre-load is applied, as described below, between the second projection 68 and the second recess 69. Even when the output member 22 moves in the radial direction R1 relative to the inner ring 391 in the bearing ring unit 39, therefore, an engagement between the second projection 68 and the second recess 69 is well-fitted. As a result, an inferior engagement does not occur between the second projection 68 and the second recess 69.

A first uneven engagement section may be formed by respectively forming bevel gears on the first power transmission surface 70 of the input member main body 201 and the first end surface 71 of the inner ring 391. A second uneven engagement section may be formed by respectively forming bevel gears on the second end surface 73 of the inner ring 391 and the second power transmission surface 72 of the output member 22. In this case, the first projection and the second projection are respectively composed of teeth of the bevel gears, and the first recess and the second recess are respectively formed of grooves between the teeth of the bevel gears.

Referring to FIG. 3, the rotor 231 in the transmission ratio variable motor 23 includes a cylindrical rotor core 85 extending in the axial direction S, and a permanent magnet 86 fixed to an outer peripheral surface of the rotor core 85. The torque sensor 44 is housed inside in a radial direction of the rotor core 85. The rotor core surrounds both the first uneven engagement section 64 and the second uneven engagement section 67 over their whole peripheries while surrounding the torque sensor 44 over its whole periphery.

The transmission ratio variable mechanism 5 and the torque sensor 44 are housed in the rotor core 85 so that the length of the housing 24 in the axial direction S can be reduced. As a result, a shock absorption stroke for absorbing a shock in secondary collision of the vehicle can be kept long. An arrangement space of a tilt telescopic mechanism (not illustrated) provided adjacent to the housing 24 can be ensured.

In the present embodiment, the inner peripheral section 230 in the rotor core 85 for supporting the outer ring 392 in the bearing ring unit 39 rotatably supports the input member 20 via the first bearing 31 while rotatably supporting the output member 22 via the third bearing 33.

The rotor core 85 is supported at both its ends by second and fourth bearings 32 and 34 with the first and third bearings 31 and 33 sandwiched between the second and the fourth bearings 32 and 34 in the axial direction S. The second bearing and the fourth bearing 34 (two bearings) are arranged to sandwich the input member 20, the bearing ring unit 39, and the output member 22 between the second and the fourth bearings 32 and 34 in the axial direction S (the axial direction of the first axis A).

More specifically, an inner ring 311 in the first bearing 31 is press-fitted and fixed to an outer peripheral surface of the cylindrical member 202 in the input member 20. An outer peripheral surface of an outer ring 312 in the first bearing 31 is press-fitted and fixed to a first bearing holding hole 211 formed on the inner periphery of an intermediate portion of the rotor core 85.

The movement in the axial direction S of the outer ring 312 relative to the rotor core 85 is regulated by an annular step 215 adjacent to the first bearing holding hole 211 and the collar 223 in a first ring member 221, described below. The inner peripheral section 230 in the rotor core 85 rotatably supports the other end 11a of the first shaft 11 via the first bearing 31 and the cylindrical member 202 in the input member 20.

A second bearing holding hole 212 is formed at one end of the rotor core 85. An annular bearing holding section 88 is arranged inside in a radial direction of the second bearing holding hole 212. The bearing holding section 88 is formed in an annular projection 89 formed on the side of an inner diameter portion at one end of the first housing 51. The first ring member 221 is attached to the second bearing holding hole 212. The first ring member 221 includes an annular section 222, and an annular collar section 223 provided at one end of the annular section 222. An outer peripheral surface of the annular section 222 is press-fitted and fixed to an inner peripheral surface of the second bearing holding hole 212. The collar section 223 extends inward in a radial direction of the annular section 222 with respect to the annular section 222.

The second bearing 32 is interposed between the second bearing holding hole 212 and the annular section 222 and the bearing holding section 88. An inner peripheral surface of an inner ring 321 in the second bearing 32 is press-fitted and fixed to the bearing holding section 88. An outer peripheral surface of an outer ring 322 in the second bearing 32 is press-fitted and fixed to an inner peripheral surface of the annular section 222. One end surface of the outer ring 322 is received by the collar section 223 in the first ring member 221. According to the above-mentioned configuration, one end of the rotor core 85 is rotatably supported on the first housing 51 via the second bearing 32.

An inner ring 331 in the third bearing 33 is press-fitted and fixed to an outer peripheral surface of the output member 22. An outer peripheral surface of an outer ring 332 in the third bearing 33 is press-fitted and fixed to a third bearing holding hole 213 formed on the inner periphery of the intermediate portion of the rotor core 85. The outer ring 332 regulates movement in the axial direction S relative to the rotor core 85 by an annular step 216 in the rotor core 85 and a collar section 226 in a second ring member 224, described below. The inner peripheral section 230 in the rotor core 85 rotatably supports one end 12a of the second shaft 12 via the third bearing and the output member 22.

A fourth bearing holding hole 214 is formed at the outer end of the rotor core 85. An annular bearing holding section 217 is arranged inside in a radial direction of the fourth bearing holding hole 214. The bearing holding section 217 is formed on the outer periphery at a base end of an annular extension section 92 in the second housing 52. The annular extension section 92 is formed in a cylindrical shape. The annular extension section 92 extends toward one side S1 of the axial direction S from a bulkhead section 93 provided at the other end of the second housing 52, and is inserted through the rotor core 85.

The second ring member 224 is attached to the fourth bearing holding hole 214. The second ring member 224 includes an annular section 225, and the annular collar section 226 provided at one end of the annular section 225. An outer peripheral surface of the annular section 225 is press-fitted and fixed to an inner peripheral surface of the fourth bearing holding hole 214. The collar section 226 extends inward in a radial direction of the annular section 225 with respect to the annular section 225.

The fourth bearing 34 is interposed between the fourth bearing holding hole 214 and the annular section 225 and the bearing holding section 217. An inner peripheral surface of an inner ring 341 in the fourth bearing 34 is press-fitted and fixed to the bearing holding section 217. One end of the inner ring 341 abuts on an annular step 218 formed in the annular extension section 92 so that movement toward the other side S2 of the axial direction S is regulated. An outer peripheral surface of an outer ring 342 in the fourth bearing 34 is press-fitted and fixed to an inner peripheral surface of the annular section 225. According to the above-mentioned configuration, the other end of the rotor core 85 is rotatably supported on the second housing 52 via the fourth bearing 34.

As described above, the inner rings 311, 321, 331, and 341 and the outer rings 312, 322, 332, and 342 in the first to fourth bearings 31 to 34 are press-fitted and fixed to the corresponding members. The outer ring 392 in the bearing ring unit 39 is also press-fitted and fixed to the rotor core 85.

All the first to fourth bearings 31 to and the bearing ring units 39 have a non-clearance structure in which an internal clearance in the bearing is made substantially zero. As a result, the bearing ring unit 39 is prevented from falling due to clearances of the first to fourth bearings 31 to 34 and the bearing ring unit 39.

All the rotor core 85, the first to fourth bearings 31 to 34, the bearing ring unit 39, the input member 20, and the output member 22 are formed of materials of the same type. Examples of the materials of the same type include steel. Thus, malfunctions such as non-uniformities in amounts of thermal expansion of the first to fourth bearings 31 to 34 and the bearing ring unit 39 are inhibited from occurring. As a result, malfunctions caused by each of the first to fourth bearings 31 to 34 and the bearing ring unit 39 having the above-mentioned non-clearance structure can be inhibited from occurring.

Pre-loads are respectively applied to the first uneven engagement section 64 and the second uneven engagement section 67. More specifically, the inner ring 321 in the second bearing 32 is press-fitted and fixed to the bearing holding section 88. A clearance in the axial direction S between the second bearing 32 and the annular step 218 in the second housing 52 is set to a predetermined value.

Thus, the first ring member 221, the first bearing 31, the input member 20, the first uneven engagement section 64, the inner ring 391, the second uneven engagement section 67, the output member 22, the third bearing 33, the second ring member 224, and the fourth bearing 34 are sandwiched in the axial direction S between the second bearing 32 and the annular step 218.

According to such a configuration, the inner ring 321 in the second bearing 32 urges the first ring member 221 toward the other side 52 of the axial direction S via a rolling element and the outer ring 322 in the second bearing 23. An urging force produced by the urging is transmitted to the outer ring 312 in the first bearing 31 via the annular collar section 223 in the first ring member 221, and is further transmitted to the inner ring 311 via a rolling element in the first bearing 31. Thus, the inner ring 311 is urged toward the other side S2 of the axial direction S.

Thus, the input member 20 is urged toward the other side S2 of the axial direction S, and a force produced by the urging is transmitted to the first uneven engagement section 64. Further, the urging force is transmitted to the second uneven engagement section 67. The urging force transmitted to the second uneven engagement section 67 is transmitted to the output member 22, the third bearing 33, the second ring member 224, and the outer ring 342, a rolling element, and the inner ring 341 in the fourth bearing 34, and is received by the annular step 218.

The application of the above-mentioned pre-loads enables a smooth engagement between the first projection 65 and the first recess 66 and a smooth engagement between the second projection and the second recess 69.

The permanent magnet 86 in the rotor 231 has N poles and S poles equally spaced apart from each other in the circumferential direction C1 of the steering shaft 3. The permanent magnet 86 is fixed to an outer peripheral surface of the intermediate portion of the rotor core 85. The permanent magnet 86 and a part of the transmission ratio variable mechanism 5 overlap each other at their positions in the axial direction S.

The stator 232 in the transmission ratio variable mechanism motor 23 is housed in the first housing 51 in the housing 24.

The stator 232 includes a stator core 95 obtained by stacking a plurality of electromagnetic steel plates, and an electromagnetic coil 96.

The stator core 232 includes an annular yoke 97 and a plurality of teeth 98. The plurality of teeth 98 are equally spaced apart from one another in a circumferential direction of the yoke 97, and project inward in a radial direction of the yoke 97. An outer peripheral surface of the yoke 97 is fixed to an inner peripheral surface of the first housing 51 by shrinkage fit or the like. The electromagnetic coil 96 is wound around each of the teeth 98.

A bus bar 99 is arranged on the other side S2 of the axial direction S with respect to the stator 232. The bus bar 99 is housed in the second housing 52 in the state of having an annular shape as a whole, and is connected to each of the electromagnetic coils 96 in the transmission ratio variable mechanism motor 23. The bus bar 99 supplies power from the driving circuit to each of the electromagnetic coils 96.

A locking mechanism 58 is arranged on the other side S2 of the axial direction S with respect to the bus bar 99. The locking mechanism 58 is arranged to regulate rotation of the rotor 231 in the transmission ratio variable mechanism motor 23, and is housed in the second housing 52.

The locking mechanism 58 includes a section-to-be-regulated 100 that is rotatable together with the rotor core 85, and a regulation section 101 arranged to regulate rotation of the section-to-be-regulated 100 by engaging with the section-to-be-regulated 100. The section-to-be-regulated 100 is an annular member, and has a recess 102 formed on its outer peripheral surface. The recess 102 is formed at one or a plurality of points in a circumferential direction of the section-to-be-regulated 100. The rotor core 85 may be directly provided with the recess 102. In this case, the rotor core 85 constitutes the above-mentioned section-to-be-regulated 100. A part of the section-to-be-regulated 100 and a part of the torque sensor 44 overlap each other at their positions in the axial direction S.

The regulation section 101 is arranged outside in a radial direction of the section-to-be-regulated 100. The regulation section 101 is held in the second housing 52, and is movable toward the section-to-be-regulated 100. The regulation section 101 moves toward the section-to-be-regulated 100 to engage with the recess 102 so that rotation of the rotor core 85 is regulated.

A motor resolver 43 is arranged on the other side S2 of the axial direction S with respect to the locking mechanism 58. The motor resolver 43 is housed in the second housing 52, and is positioned outside in a radial direction of the rotor core 85.

A part of the motor resolver 43 and a part of the torque sensor 44 overlap each other at their positions in the axial direction S. The motor resolver 43 includes a resolver rotor 105 and a resolver stator 106. The resolver rotor 105 is fixed to an outer peripheral surface at the other end of the rotor core 85 so as to be rotatable together. The resolver stator 106 is fixed to the second housing 52.

The torque sensor 44 is arranged inside in a radial direction of the rotor core 85 in the transmission ratio variable mechanism motor 23. The torque sensor 44 includes a multipole magnet 115 fixed to the intermediate portion of the second shaft 12, and magnetic yokes 116 and 117 supported at one end of the third shaft 13. The magnetic yokes 116 and 117 are a pair of soft magnetic materials arranged in a magnetic field generated by the multipole magnet 115 and arranged to form a magnetic circuit.

The multipole magnet 115 is a permanent magnet in a cylindrical shape, and has a plurality of poles (N poles and S poles in the same number) are magnetized, equally spaced apart in its circumferential direction.

The magnetic yokes 116 and 117 surround the multipole magnet 115. Each of the magnetic yokes 116 and 117 is molded by a synthetic resin member 118. The synthetic resin member 118 is connected to one end of the third shaft 13 so as to be rotatable together.

The torque sensor 44 further includes a pair of collecting magnetic rings 119 and 120 arranged to induce magnetic fluxes from the magnetic yokes 116 and 117. The pair of collecting magnetic rings 119 and 120 is an annular member formed using a soft magnetic material. The collecting magnetic rings 119 and 120 are magnetically coupled to the magnetic yokes 116 and 117, respectively, by surrounding the magnetic yokes 116 and 117.

The collecting magnetic rings 119 and 120 are spaced apart from and opposed to each other in the axial direction S. The collecting magnetic rings 119 and 120 are molded by a synthetic resin member 121. The synthetic resin member 121 is held in the annular extension section 92 in the second housing 52.

Magnetic fluxes are respectively generated in the magnetic yokes 116 and 117 depending on a relative amount of rotation between the second and third shafts 12 and 13. The magnetic fluxes are respectively induced by the collecting magnetic rings 119 and 120, and are detected by a hall IC (not illustrated) buried in the synthetic resin member 121. This enables a magnetic flux density corresponding to a torque applied to the second shaft 12 to be detected.

Referring to FIG. 2, the fifth bearing 35 is arranged on the other side S2 of the axial direction S with respect to the torque sensor 44. The fifth bearing 35 is interposed between the bearing holding section 122 formed on the outer periphery at one end of the third shaft 13 and the bearing holding hole 123 formed in the bulkhead section 93 in the second housing 52. The bearing holding hole 123 rotatably supports one end of the third shaft 13 via the fifth bearing 35.

The third shaft 13 surrounds the second shaft 12 and the torsion bar 14. More specifically, an insertion hole 124 opened toward one end of the third shaft 13 is formed in the third shaft 13. The other end of the second shaft 12 is inserted through the insertion hole 124. An insertion hole 125 extending in the axial direction S is formed in the second shaft 12, and the torsion bar 14 is inserted through the insertion hole 125.

One end of the torsion bar 14 is connected to one end of the insertion hole 125 in the second shaft 12 by serration fitting or the like so as to be rotatable together. The other end of the torsion bar 14 is connected to the insertion hole 124 in the third shaft 13 by serration fitting or the like so as to be rotatable together.

An inner space in a radial direction of the annular extension section 92 in the second housing is a torque sensor housing chamber 126.

The second shaft 12 and the third shaft are supported on each other via the sixth bearing 36 so as to be relatively rotatable. The sixth bearing 36 is surrounded by the worm wheel in the reduction gear mechanism 26. The reduction gear mechanism 26 is housed in a housing chamber 128. The housing chamber 128 is defined by an outer peripheral section 127 in the third housing 53, the end wall section 61, and the bulkhead section 93 in the second housing 52. A part of the worm wheel 28 and the sixth bearing overlap each other at their positions in the axial direction S.

The seventh bearing 37 is interposed between an intermediate portion of the third shaft 13 and the end wall section 61 in the third housing 53. The end wall section 61 rotatably supports the third shaft 13 via the seventh bearing 37.

An inner ring 371 in the seventh bearing 37 is sandwiched between an annular step 129 formed on the outer periphery of the third shaft 13 and a nut member 130 arranged to mesh with the outer periphery of the third shaft 13. The outer ring 372 in the seventh bearing 37 is sandwiched between a annular step 131 formed in the third housing 53 and a retaining ring 132 held in the third housing 53.

As described above, according to the present embodiment, both the input member 20 and the output member 22 are supported by the inner peripheral section 230 in the same rotor core 85. Thus, coaxiality between the input member 20 and the output member 22 can be significantly increased, and a center deviation between the input member 20 and the output member 22 cannot easily occur.

As a result, each of an engagement between the first projection 65 and the first recess 66 in the first uneven engagement section 64 and an engagement between the second projection 68 and the second recess 69 in the second uneven engagement section 67 can be made similar to that in an ideal design state. Therefore, an inferior engagement between the inner ring 391 and the input member 20 and an inferior engagement between the inner ring 391 and the output member 22 can be prevented. As a result, a driving noise of the transmission ratio variable mechanism 5 can be significantly reduced. Moreover, the bearing ring unit 39, in addition to the input member 20 and the output member 22, is supported by the inner peripheral section 230 in the rotor core 85. Thus, the bearing ring unit 39 can be positioned with high precision with respect to the input member and the output member 22. As a result, the driving noise of the transmission ratio variable mechanism 5 can be further reduced.

A nutation gear mechanism is used as the transmission ratio variable mechanism 5. More specifically, a mechanism in which the second axis B serving as a center axis of the inner ring 391 and the outer ring 392 in the bearing ring unit 39 is inclined to the first axis A is used as the transmission ratio variable mechanism 5.

This enables a range of a speed ratio of the output member 22 to the input member 20 can be significantly increased. An engagement between the first projection 65 and the first recess 66 causes power to be transmitted between the inner ring 391 in the bearing ring unit 39 and the input member 20. Thus, sliding can be prevented from occurring between the inner ring 391 in the bearing ring unit 39 and the input member 20. As a result, reliable power transmission can be achieved in the first uneven engagement section 64. Further, an engagement between the second projection 68 and the second recess 69 causes power to be transmitted between the inner ring 391 in the bearing ring unit and the output member 22. Thus, sliding can be prevented from occurring between the inner ring 391 in the bearing ring unit 39 and the output member 22. As a result, reliable power transmission can be achieved in the second uneven engagement section 67.

In the first uneven engagement section 64, the first overlapping area 241 extends in the radial direction R1 perpendicular to the first axis A. When the input member 20 moves in the radial direction R1 relative to the inner ring 391, a position at which the first projection 65 and the first recess 66 mesh with each other does not move in the axial direction S. Thus, the input member 20 and the inner ring 391 can be prevented from relatively moving in the axial direction S. As a result, the first uneven engagement section can be prevented from vibrating in the axial direction S. Therefore, vibration occurring in the first uneven engagement section 64 can be significantly reduced.

In the second uneven engagement section 67, the second overlapping area 242 extends in the radial direction R1 perpendicular to the first axis A. When the output member 22 moves in the radial direction R1 relative to the inner ring 391, therefore, a position at which the second projection 68 and the second recess 69 mesh with each other does not move in the axial direction S. Thus, the output member 22 and the inner ring 391 can be prevented from relatively moving in the axial direction S. As a result, the second uneven engagement section 67 can be prevented from vibrating in the axial direction S. Therefore, vibration occurring in the second uneven engagement section 67 can be significantly reduced.

The width of the first recess 66 narrows toward the narrow section 193 from the wide section 191 in the first recess 66, and widens toward the wide section 192 from the narrow section 193. Thus, an engagement between the first projection and the first recess 66, which is caused by relative rotation between the inner ring 391 and the input member 20, can be significantly smoothed. Therefore, vibration occurring in the first uneven engagement section 64 can be further reduced.

The width of the second recess 69 narrows toward the narrow section 193 from the wide section 191 in the second recess 69, and widens toward the wide section 192 from the narrow section 193. Thus, an engagement between the second projection and the second recess 69, which is caused by relative rotation between the inner ring 391 and the output member 22, can be significantly smoothed. Therefore, vibration occurring in the second uneven engagement section 67 can be further reduced.

The first coupling 181 allows eccentricity and inclination between the first axis A serving as the center axis of the input member 20 and the center axis F of the first shaft 11. When the first axis A of the input member 20 and the center axis F of the first shaft 11 are eccentrically arranged or inclinedly arranged due to precision at the time of assembling of the transmission ratio variable mechanism 5, for example, therefore, no unreasonable force is exerted between the input member 20 and the first shaft 11. As a result, a force to reduce coaxiality between the input member 20 and the output member 22 can be inhibited from being exerted on the input member 20 and the output member 22. Thus, an inferior engagement between the first projection 65 and the first recess 66 can be inhibited from occurring in the first uneven engagement section 64. Therefore, the driving noise of the transmission ratio variable mechanism 5 can be reliably inhibited from increasing.

The second coupling 185 allows eccentricity and inclination between the first axis A serving as the center axis of the output member 22 and the center axis G of the second shaft 12. Even when the first axis A of the output member and the center axis G of the second shaft 12 are eccentrically arranged or inclinedly arranged due to precision at the time of assembling of the transmission ratio variable mechanism 5, for example, therefore, no unreasonable force is exerted between the output member 22 and the second shaft 12. As a result, a force to reduce coaxiality between the input member 20 and the output member 22 can be inhibited from being exerted on the input member 20 and the output member 22. Thus, an inferior engagement can be inhibited from occurring between the second projection 68 and the second recess 69 in the second uneven engagement section 64. Therefore, the driving noise of the transmission ratio variable mechanism 5 can be reliably inhibited from increasing.

Furthermore, the second bearing 32 and the fourth bearing 34 arranged to rotatably support the rotor core 85 are arranged to sandwich the input member 20, the bearing ring unit 39, and the output member 22 in the axial direction S. Thus, the rotor core 85 is supported at its two points sufficiently spaced apart from each other by the second and fourth bearings 32 and 34. Thus, strength with which the housing 24 supports the rotor 231 in the transmission ratio variable mechanism motor 23 can be increased. Therefore, the rotor 231, the input member 20 supported by the rotor 231, the bearing ring unit 39, and the output member 22 can be reliably inhibited from vibrating.

As described above, a center deviation between the input member 20 and the output member 22 does not easily occur, so that the driving noise of the transmission ratio variable mechanism 5 is reduced. Therefore, the vehicle steering apparatus 1 superior in quietness can be implemented.

The present invention is not limited to the contents of the above-mentioned embodiment. Various changes can be made within the scope of the claims.

Differences from the above-mentioned embodiment will be mainly described below. Similar components to those in the above-mentioned embodiment are assigned similar reference numerals and hence, the description thereof is not repeated.

Figure 11A:
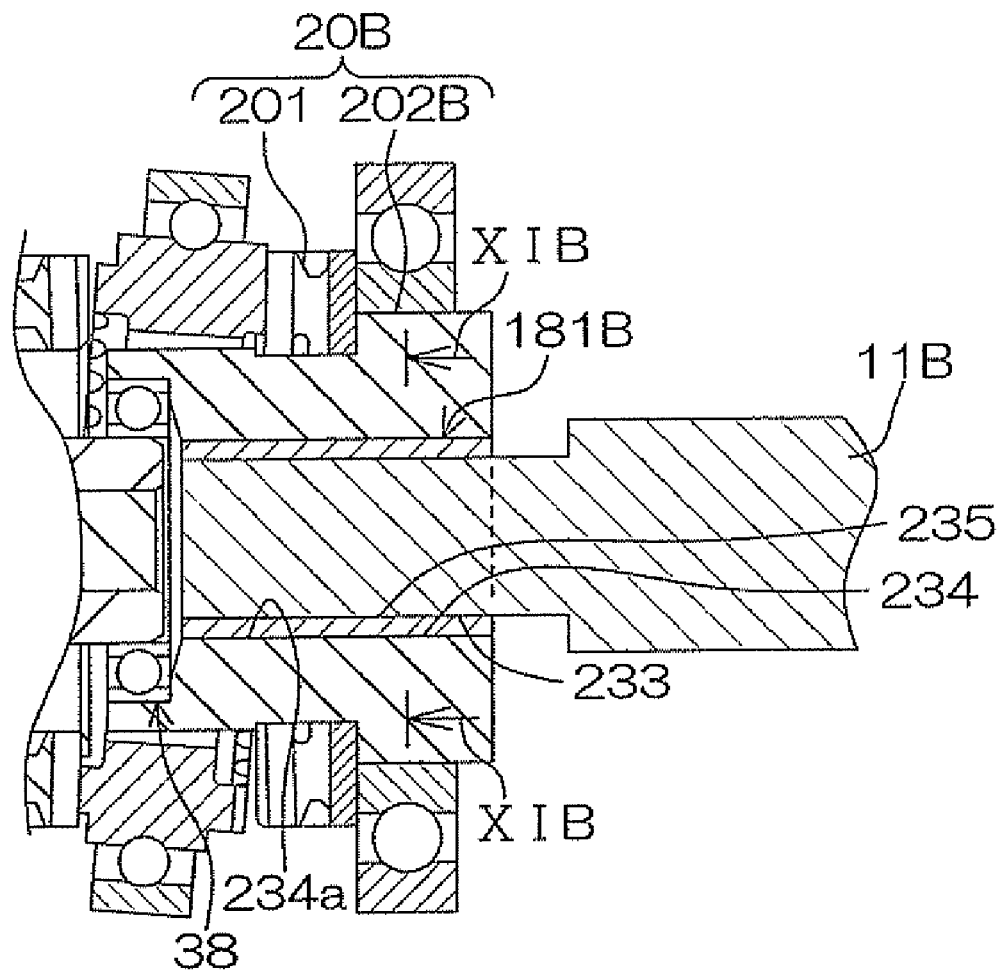
FIG. 11A is a cross-sectional view of a principal part around a first coupling in still another embodiment of the present invention.
Figure 11B:
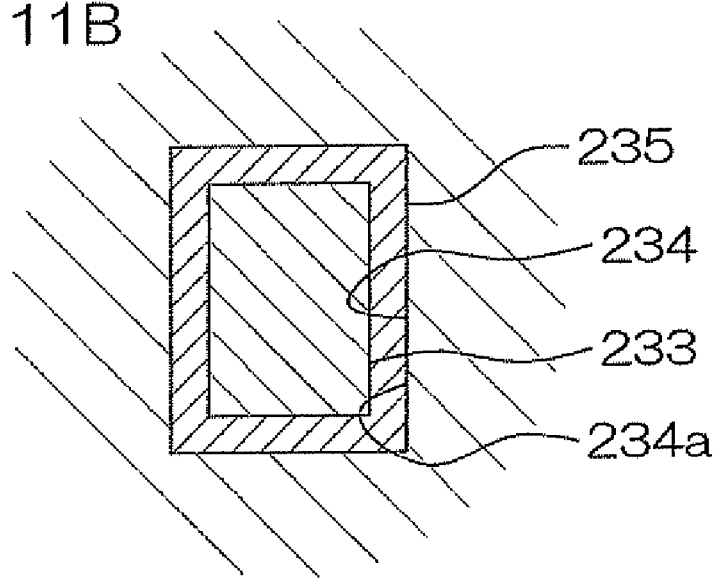
FIG. 11B is a cross-sectional view taken along a line XIB-XIB illustrated in FIG. 10A.

For example, the first coupling 181 is not limited to a spline fitting structure. It may be another structure. For example, the first coupling 181 may be replaced with a first coupling 181B illustrated in FIGS. 11A and 11B.

The first coupling 181B includes an engagement projection 233 formed at the other end of a first shaft 11B, an inner peripheral surface 234a of an engagement hole 234 formed in a cylindrical member 202B in an input member 20B, and an elastic member 235.

A cross-sectional shape of the engagement projection 233 has a polygonal shape such as a rectangular shape. The engagement projection 233 is inserted through the engagement hole 234. A cross-sectional shape of the engagement hole 234 is analogous to the cross-sectional shape of the engagement projection 233. The annular elastic member 235 is inserted between an outer peripheral surface of the engagement projection 233 and the inner peripheral surface 234a of the engagement hole 234. The elastic member 235 is arranged to bury a clearance between the engagement projection 233 and the inner peripheral surface 234a of the engagement hole 234.

Figure 12:
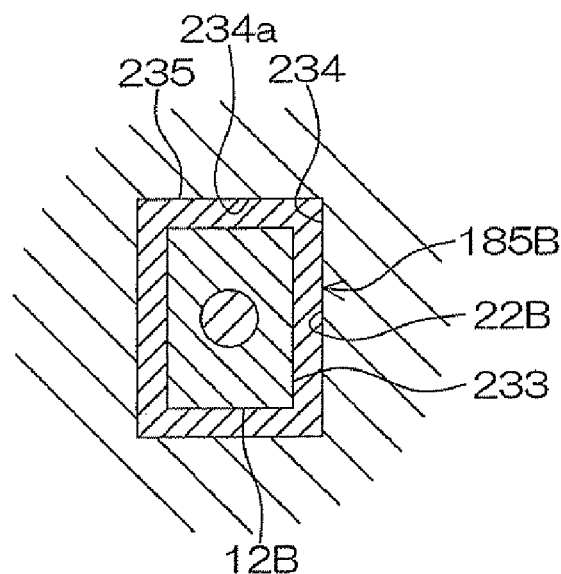
FIG. 12 is a cross-sectional view of a principal part of a second coupling in still another embodiment of the present invention.

The second coupling 185 may be replaced with a second coupling similar to the first coupling 181B. More specifically, as illustrated in FIG. 12, a second coupling 185B includes an engagement projection 233 formed at one end of a second shaft 12B, an inner peripheral surface 234a of an engagement hole 234 formed in an output member 22B, and an elastic member 235.

Figure 13:
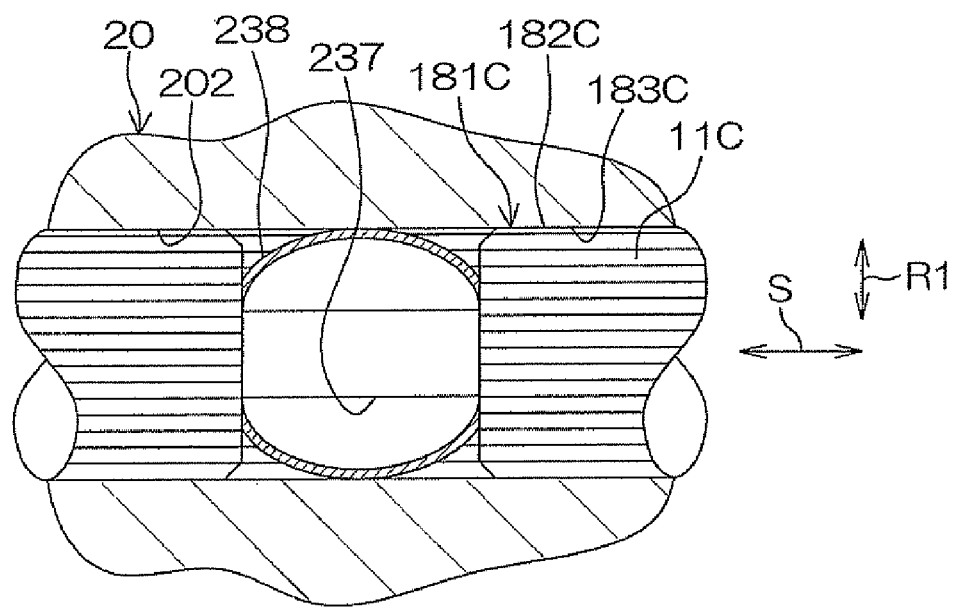
FIG. 13 is a cross-sectional view of a principal part of a first coupling in still another embodiment of the present invention.

The first coupling 181 may be replaced with a first coupling 181C illustrated in FIG. 13. In the first coupling 181C, a male spline 182C and a female spline 183C in a first shaft 11C are directly fitted to each other, an annular elastic member 238 is inserted through an annular groove 237 formed in an intermediate portion of the male spline 182C. The elastic member 238 has such a shape that the center in its axial direction S projects outward in the radial direction R1. The elastic member 238 is interposed between the first shaft 11C and a cylindrical member 202 in an input member 20 in a radial direction R1.

In this case, eccentricity and inclination between a center axis of the male spline 182C and a center axis of the female spline 183C are allowed by making the sizes of the male spline 182C and the female spline 183C different from each other, making addendum modification coefficients of the spline teeth different from each other, or subjecting at least one of the spline teeth to crowning.

Figure 14:
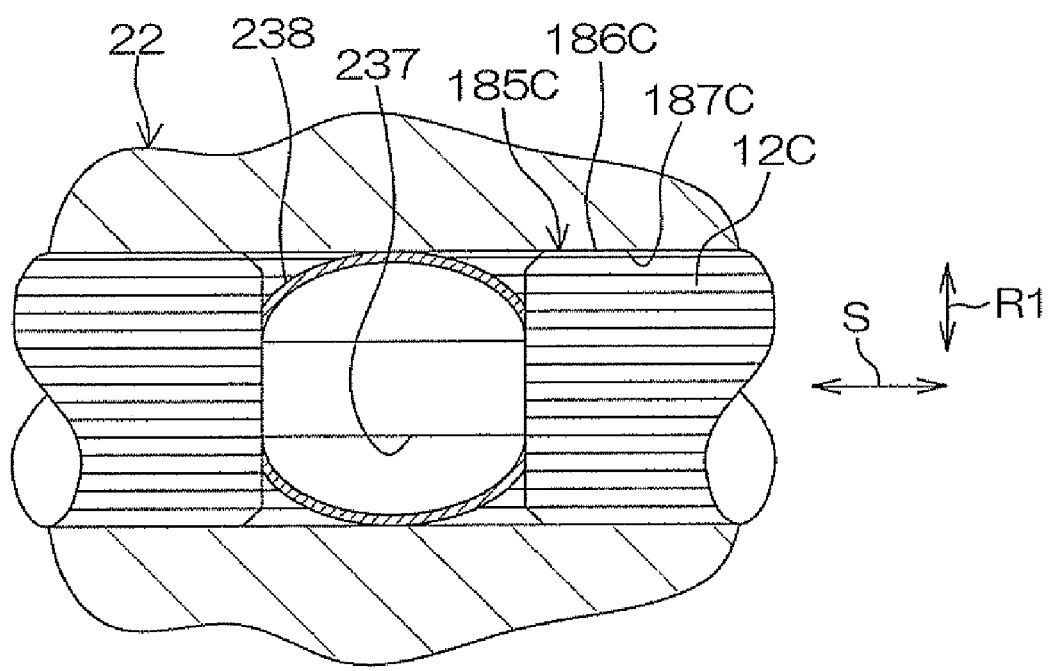
FIG. 14 is a cross-sectional view of a principal part of a second coupling in still another embodiment of the present invention.

The second coupling 185 may be replaced with a similar second coupling to the first coupling 181C. More specifically, as illustrated in FIG. 14, in a second coupling 185C, a male spline 186C and a female spline 187C in a second shaft 12C are directly fitted to each other while an annular elastic member 238 is interposed in an annular groove 237 formed in an intermediate portion of the male spline 186C. The elastic member 238 is interposed between the second shaft 12C and an output member 22 in a radial direction R1.

In this case, eccentricity and inclination between a center axis of the male spline 186C and a center axis of the female spline 187C are allowed by making the sizes of the male spline 186C and the female spline 187C different from each other, making addendum modification coefficients of spline teeth of the male spline 186C and the female spline 187C different from each other, or subjecting the spline teeth of at least one of the splines to crowning.

Furthermore, as the first coupling, a coupling to allow only either one of eccentricity and inclination between a center axis of a first shaft and a first axis of an input member may be used. Alternatively, as the first coupling, a coupling to allow neither one of eccentricity and inclination between the center axis of the first shaft and the first axis of the input member may be used.

Similarly, as the second coupling, a coupling to allow only either one of eccentricity and inclination between a center axis of a second shaft and a first axis of an output member may be used. Alternatively, as the second coupling, a coupling to allow neither one of eccentricity and inclination between the center axis of the second shaft and the first axis of the output member may be used.

An example of the coupling to allow eccentricity is an Oldham coupling.

Figure 15:
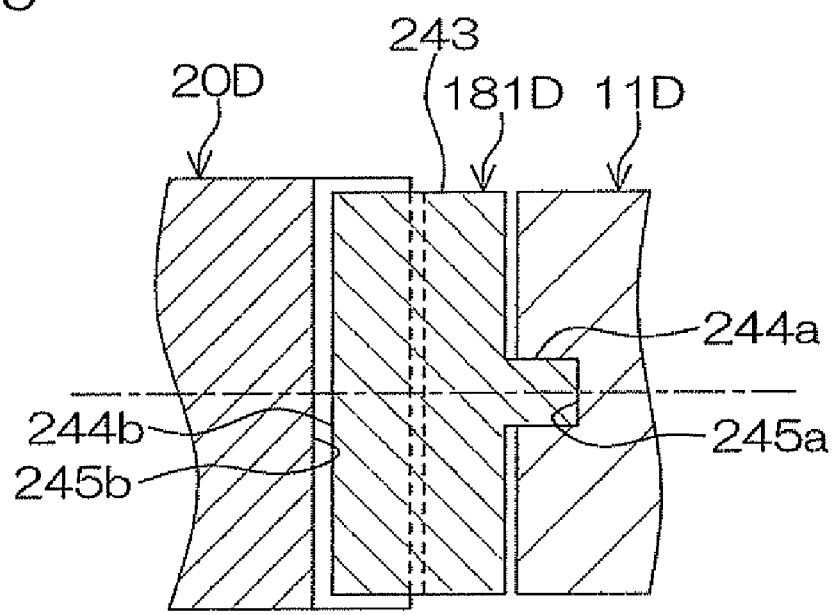
FIG. 15 is a cross-sectional view of a principal part of a first coupling in still another embodiment of the present invention.

As illustrated in FIG. 15, an example of a first coupling 181D is an Oldham coupling. The first coupling 181D includes an intermediate member 243 arranged between the other end of a first shaft 11D and one end of an input member 20D. The intermediate member 243 has a circular disk shape. A projection 244a is formed on one end surface of the intermediate member 243. A projection 244b is formed on the other end surface of the intermediate member 243. Respective phases in a circumferential direction of the intermediate member 243 of the projection 244a and the projection 244b differ from each other by 90 degrees, for example. The projection 244a is fitted to a recess 245a formed on the other end surface of the first shaft 11D so as to be movable linearly back and forth. The projection 244b is fitted to a recess 245b formed on one end surface of the input member 20D so as to be movable linearly back and forth. Arrangements of the projection 244a and the recess 245a may be replaced with each other. Arrangements of the projection 244b and the recess 245b may be replaced with each other.

Figure 16:
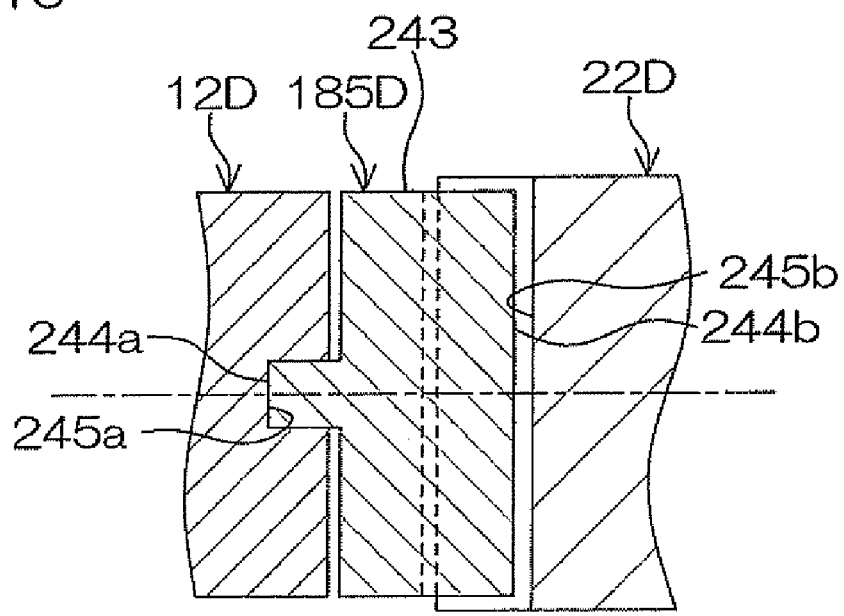
FIG. 16 is a cross-sectional view of a principal part of a second coupling in still another embodiment of the present invention.

As illustrated in FIG. 16, an example of a second coupling 185D is an Oldham coupling. The second coupling 185D includes an intermediate member 243 arranged between one end of a second shaft 12D and the other end of an output member 22D. The intermediate member 243 has a similar configuration to that of the intermediate member 243 illustrated in FIG. 15. A projection 244a in the intermediate member 243 is fitted to a recess 245a formed on one end surface of a second shaft 12D so as to be movable linearly back and forth. A projection 244b is fitted to a recess 245b formed on the other end surface of the output member 22D so as to be movable linearly back and forth.

An example of the above-mentioned coupling to allow inclination is a universal coupling.

Figure 17:
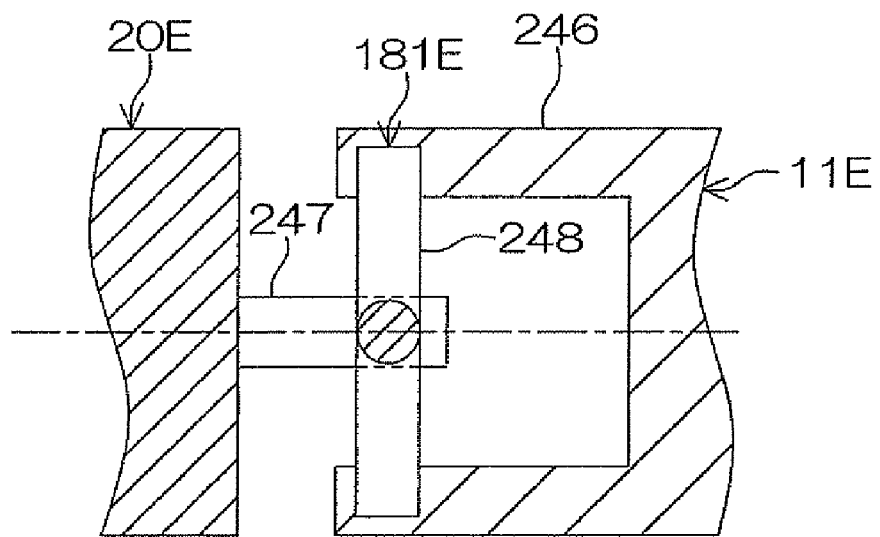
FIG. 17 is a partially sectional view of a principal part of a first coupling in still another embodiment of the present invention.

As illustrated in FIG. 17, an example of a first coupling 181E is a universal coupling. The first coupling 181E includes one york 246 in a U shape provided at the other end of a first shaft 11E, the other yoke 247 in a U shape provided at one end of an input member 20E, and a joint cross 248 arranged between the pair of yokes 246 and 247. Two shafts linearly arranged in the joint cross 248 are respectively connected to leading ends of the one yoke 246 so as to be relatively rotatable. Other two shafts linearly arranged in the joint cross 248 are respectively connected to leading ends of the other yoke 247 so as to be relatively rotatable.

Figure 18:
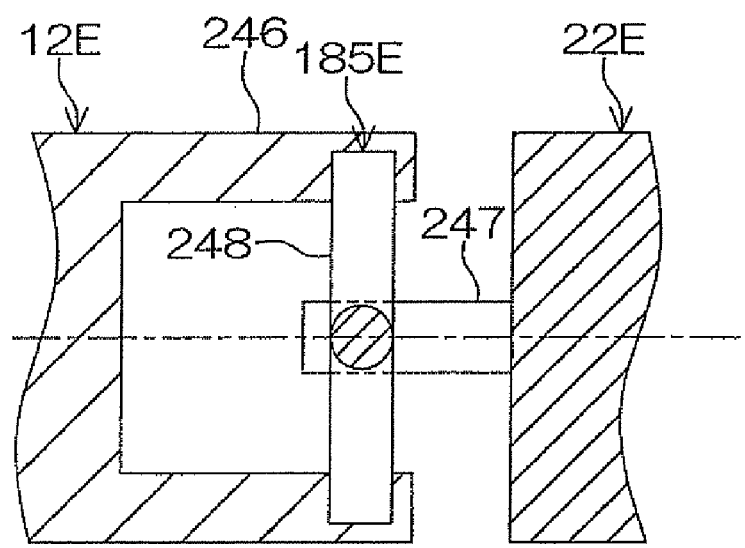
FIG. 18 is a partially sectional view of a principal part of a second coupling in still another embodiment of the present invention.

As illustrated in FIG. 18, an example of a second coupling 185E is a universal coupling. The second coupling 185E includes one yoke 246 provided at one end of a second shaft 12E, the other yoke 247 provided at the other end of the output member 22E, and a joint cross 248.

An example of the above-mentioned coupling to allow neither one of eccentricity and inclination is a key coupling.

An inner ring of a bearing ring unit may be driven to rotate by a transmission ratio variable mechanism motor while an outer ring and an input member may be connected to each other by a first uneven engagement section, and the outer ring and an output member may be connected to each other by a second uneven engagement section.

Furthermore, although in each of the above-mentioned embodiments, the steering assist motor 25 is applied to a column type electric power steering apparatus arranged in a steering column, the present invention is not limited to this. For example, the present invention may be applied to a rack assist type electric power steering apparatus in which a steering assist motor 25 is provided in a steering rack housing.

The transmission ratio variable mechanism according to the present invention is applicable to devices other than a vehicle steering apparatus. The transmission ratio variable mechanism according to the present invention can be used for a toe angle variable mechanism arranged to change a toe angle of a wheel of a vehicle, a camber angle variable mechanism arranged to change a camber angle of a wheel of a vehicle, and a damping force variable mechanism arranged to change a damping force of a shock absorber of a vehicle, for example.

While the present invention has been described in detail with reference to specific embodiments, it is to be understood that those skilled in the art who have understood the above-mentioned contents will easily consider its changes, modifications, and equivalents. Therefore, the present invention should be within the scope of the claims and their equivalents.

This application claims priority from Japanese Patent Application No. 2008-177321 filed with the Japanese Patent Office on Jul. 7, 2008, which is hereby incorporated by reference herein in its entirety.

DESCRIPTION OF REFERENCE SYMBOLS 1 denotes a vehicle steering apparatus, denotes a steering member, 4R and 4L denote steerable wheels, 5 denotes a transmission ratio variable mechanism, 11, 11B, 11C, 11D, and 11E denote first shafts (input shafts), 12, 12B, 12C, 12D, and 12E denote second shafts (output shafts), 20, 20B, 20D, and 20E denote input members, 22, 22B, 22D, and 22E denote output members, 23 denotes a transmission ratio variable mechanism motor, 24 denotes a housing, 31 denotes a first bearing (a bearing arranged to support the input member), 32 denotes a second bearing (one of two bearings), 33 denotes a third bearing (a bearing arranged to supply the output member), 34 denotes (one of two bearings), 39 denotes a bearing ring unit (an intermediate member), 64 denotes a first uneven engagement section, 65 denotes a first projection, denotes a first recess, 67 denotes a second uneven engagement section, 68 denotes a second projection, 69 denotes a second recess, 70 denotes a first power transmission surface, 71 denotes a first end surface, 72 denotes a second power transmission surface, 73 denotes a second end surface, 181, 181B, 181C, 181D, and 181E denote first couplings, 185, 185B, 185C, 185D, 185D, and 185E denote second couplings, 191 denotes a wide section (one end of the first recess, one end of the second recess), 192 denotes a wide section (the other end of the first recess, the other end of the second recess), 193 denotes a narrow section (the center of the first recess, the center of the second recess), 194 denotes an annularly-arranged pitch surface (of the first projection), 195 denotes an annularly-arranged pitch surface (of the first recess), 196 denotes an annularly-arranged pitch surface (of the second projection), 197 denotes an annularly-arranged pitch surface (of the second recess), 230 denotes an inner peripheral surface (of a rotor), 231 denotes a rotor, 241 denotes a first overlapping area, 242 denotes a second overlapping area, 391 denotes an inner ring, 392 denotes an outer ring, 393 denotes a rolling element, A denotes a first axis, B denotes a second axis, R1 denotes a radial direction (a direction perpendicular to the first axis), R2 denotes a radial direction (of an inner ring of the bearing ring unit), R3 denotes a radial direction (a direction perpendicular to the first axis), F denotes a center axis (of the first shaft serving as the input shaft), G denotes a center axis (of the second shaft serving as the output shaft), θ1 denotes a steering angle, θ2 denotes a steered angle, and θ2/θ1 denotes a transmission ratio.

The invention claimed is:

1. A transmission ratio variable mechanism comprising:
an input member and an output member arranged to rotate around a first axis;
an intermediate member arranged to connect the input member and the output member so as to be differentially rotatable; and
a motor arranged to drive the intermediate member,
wherein the motor includes a cylindrical rotor arranged to rotate around the first axis, and
an inner periphery of the rotor is arranged to support the intermediate member and arranged to rotatably support the input member and the output member via bearings, respectively.

2. The transmission ratio variable mechanism according to claim 1, wherein the intermediate member includes an inner ring having first and second end surfaces, and an outer ring arranged to rotatably support the inner ring via a rolling element and arranged to fit to the inner periphery of the rotor, a second axis serving as a center axis of the inner ring and the outer ring is inclined to the first axis, the input member includes a first power transmission surface opposed to the first end surface of the inner ring, and the output member includes a second power transmission surface opposed to the second end surface of the inner ring, the transmission ratio variable mechanism further comprising:

a first uneven engagement section arranged to engage the first end surface of the inner ring and the first power transmission surface of the input member so as to be power-transmittable, and a second uneven engagement section arranged to engage the second end surface of the inner ring and the second power transmission surface of the output member so as to be power-transmittable, wherein the first uneven engagement section includes a first projection provided on one of the first end surface and the first power transmission surface, and a first recess provided on the other surface and arranged to engage with the first projection, and the second uneven engagement section includes a second projection provided on one of the second end surface and the second power transmission surface, and a second recess provided on the other surface and arranged to engage with the second projection.

3. The transmission ratio variable mechanism according to claim 2, wherein the first projection includes a plurality of projections arranged along its annularly-arranged pitch surface, the first recess includes a plurality of recesses arranged along its annularly-arranged pitch surface, a part of the annularly-arranged pitch surface of the first projection and a part of the annularly-arranged pitch surface of the first recess overlap each other, to form a first overlapping area, and the first overlapping area extends in a direction perpendicular to the first axis.

4. The transmission ratio variable mechanism according to claim 2, wherein the second projection includes a plurality of projections arranged along its annularly-arranged pitch surface, the second recess includes a plurality of recesses arranged along its annularly-arranged pitch surface, a part of the annularly-arranged pitch surface of the second projection and a part of the annularly-arranged pitch surface of the second recess overlap each other, to form a second overlapping area, and the second overlapping area extends in a direction perpendicular to the first axis.

5. The transmission ratio variable mechanism according to claim 2, wherein the first projection linearly extends in a radial direction of a surface on which the first projection is formed, the first recess extends in a radial direction of a surface on which the first recess is formed, and the width of the first recess narrows from one end of the first recess toward the center of the first recess, and widens from the center of the first recess toward the other end of the first recess.

6. The transmission ratio variable mechanism according to claim 2, wherein the second projection linearly extends in a radial direction of a surface on which the second projection is formed, the second recess extends in a radial direction of a surface on which the second recess is formed, and the width of the second recess narrows from one end of the second recess toward the center of the second recess, and widens from the center of the second recess toward the other end of the second recess.

7. The transmission ratio variable mechanism according to claim 1, further comprising an input shaft, and a first coupling arranged to connect the input member and the input shaft so as to be torque-transmittable, wherein the first coupling is a coupling that allows at least one of eccentricity and inclination between the first axis serving as a center axis of the input member and a center axis of the input shaft.

8. The transmission ratio variable mechanism according to claim 1, further comprising an output shaft, and a second coupling arranged to connect the output member and the output shaft so as to be torque-transmittable, wherein the second coupling is a coupling that allows at least one of eccentricity and inclination between the first axis serving as a center axis of the output member and a center axis of the output shaft.

9. The transmission ratio variable mechanism according to claim 1, further comprising a housing that houses the rotor, and two bearings arranged between the rotor and the housing and arranged to rotatably support the rotor, wherein the two bearings are arranged to sandwich the input member, the intermediate member, and the output member in an axial direction of the first axis.

10. A vehicle steering apparatus comprising:

a steering member, a steerable wheel, and a transmission ratio variable mechanism arranged to change a transmission ratio serving as a ratio of a steered angle of the steerable wheel to a steering angle of the steering member, the transmission ratio variable mechanism including:

an input member and an output member arranged to rotate around a first axis;

an intermediate member arranged to connect the input member and the output member so as to be differentially rotatable; and a motor arranged to drive the intermediate member, wherein the motor includes a cylindrical rotor arranged to rotate around the first axis, an inner periphery of the rotor is arranged to support the intermediate member and arranged to rotatably support the input member and the output member via bearings, respectively, the input member connects to the steering member, and the output member connects to the steerable wheel.

* * * * *